(12) United States Patent
Artz

(10) Patent No.: US 10,997,266 B2
(45) Date of Patent: *May 4, 2021

(54) SYSTEMS AND METHODS FOR IMPROVED WEB-BASED DOCUMENT RETRIEVAL AND OBJECT MANIPULATION

(71) Applicant: Oath Inc., Dulles, VA (US)

(72) Inventor: David Ryan Artz, Leesburg, VA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,686

(22) Filed: Aug. 7, 2019

(65) Prior Publication Data

US 2020/0034400 A1 Jan. 30, 2020

Related U.S. Application Data

(63) Continuation of application No. 15/713,568, filed on Sep. 22, 2017, now Pat. No. 10,417,300, which is a continuation of application No. 12/457,758, filed on Jun. 19, 2009, now Pat. No. 9,792,385.

(51) Int. Cl.
*G06F 17/00* (2019.01)
*G06F 16/957* (2019.01)

(52) U.S. Cl.
CPC ...... *G06F 16/9577* (2019.01); *G06F 16/9574* (2019.01)

(58) Field of Classification Search
CPC ............ G06F 16/9577; G06F 16/9574; G06F 2203/0339; G06F 17/2247; G06F 40/166; G06F 40/14
USPC .................................. 715/234, 235, 786, 200
See application file for complete search history.

(56) References Cited

U.S. PATENT DOCUMENTS

| 7,149,981 B1 | 12/2006 | Lundy et al. |
| 7,219,309 B2 | 5/2007 | Kaasila et al. |
| 7,461,353 B2 | 12/2008 | Rohrabaugh et al. |
| 7,469,381 B2 | 12/2008 | Ording |
| 7,502,867 B2 | 3/2009 | Mitchell et al. |

(Continued)

FOREIGN PATENT DOCUMENTS

WO WO 2008/1222202 A1 10/2008

OTHER PUBLICATIONS

Breen, Christopher, "The Iphone Pocket Guide", 2008, *Peachpit Press*, pp. 1-249.
Lazy Loader, Wayback Feb. 28, 2009, appelsiini.net, pp. 1-4.
International Search Report and Written Opinion dated Sep. 29, 2010, corresponding to PCT/US2010/038097, 8 pages.

(Continued)

*Primary Examiner* — Manglesh M Patel
(74) *Attorney, Agent, or Firm* — Bookoff McAndrews, PLLC

(57) ABSTRACT

Systems and methods are provided for improving web-based document retrieval and object manipulation. In an implementation, objects within web documents (e.g., a web page) are manipulated when the objects are visible through a viewport of a user's web browser. According to a method, an object selected from a web document is manipulated when that selected object is displayed within the viewport of the user's browser. The manipulation may include downloading content associated with the stored object and additionally, or alternatively, executing a script associated with the stored object. Additionally, or independently, methods may be provided for blocking the download of an object in a retrieved web document until that object is displayed or visible in the user's browser viewport.

20 Claims, 13 Drawing Sheets

(56) References Cited

U.S. PATENT DOCUMENTS

| | | |
|---|---|---|
| 7,805,523 B2 | 9/2010 | Mitchell et al. |
| 7,934,166 B1 | 4/2011 | Clark |
| 7,978,176 B2 | 7/2011 | Forstall et al. |
| 2002/0116392 A1 | 8/2002 | McGrath |
| 2005/0028108 A1 | 2/2005 | Baudisch et al. |
| 2005/0177305 A1 | 8/2005 | Han |
| 2006/0064647 A1 | 3/2006 | Tapuska et al. |
| 2006/0085764 A1 | 4/2006 | Klementiev |
| 2006/0136839 A1 | 6/2006 | Makela |
| 2007/0083821 A1 | 4/2007 | Garbow et al. |
| 2007/0097150 A1 | 5/2007 | Ivashin et al. |
| 2008/0163065 A1 | 7/2008 | Vartiainen et al. |
| 2009/0002324 A1 | 1/2009 | Harbeson et al. |
| 2010/0100842 A1 | 4/2010 | Kim |
| 2011/0029899 A1 | 2/2011 | Fainberg |
| 2012/0144288 A1 | 6/2012 | Caruso |
| 2012/0272136 A1 | 10/2012 | Takami |
| 2013/0185164 A1 | 7/2013 | Pottjegort |

OTHER PUBLICATIONS

"Dynamic Selection Marquee Feedback", IBM Technical Disclosure Bulletin, International Business Machines Corp., vol. 34, No. 10B, Mar. 1, 1992, 4 pages.

"Dynamic Marquee Selection Support in the Container Control," IBM Technical Disclosure Bulletin, International Business Machines Corp., vol. 36, No. 8, Aug. 1, 1993, 5 pages.

"Visual for Multiple-Icon Drag Movement", IBM Technical Disclosure Bulletin, International Business Machines Corp., vol. 37, No. 9, Sep. 1, 1994, 4 pages.

"Mouse Style 3—A New Style for Using the Mouse in Text Editors", IBM Technical Disclosure Bulletin, International Business Machines Corp., vol. 36, No. 9A, Sep. 1, 1993, 2 pages.

"Best Firefox Download Manager Integration—Screenshots", flashgot.net, Aug. 22, 2018, 8 pages, Retrieved from: http://web.archive.org/web/20080822184619/flashgot.net/screenshots [retrieved on Sep. 10, 2010].

"Introduction to Range," quirksmode.org May 31, 2008, 5 pages, Retrieved from: [http://web.archive.org/web/20080531061201/www.quirksmode.org/dom/range_intro.html [retrieved on Sep. 10, 2010].

SYSTEMS AND METHODS FOR IMPROVED WEB-BASED DOCUMENT RETRIEVAL AND OBJECT MANIPULATION

CROSS-REFERENCE TO RELATED APPLICATION(S)

This patent application is a continuation of and claims the benefit of priority to U.S. Nonprovisional patent application Ser. No. 15/713,568, filed Sep. 22, 2017, which is a continuation of U.S. Nonprovisional patent application Ser. No. 12/457,758, filed on Jun. 19, 2009, now U.S. Pat. No. 9,792,385, issued on Oct. 17, 2017, the entireties of which are incorporated herein by reference.

BACKGROUND

Technical Field

The present disclosure generally relates to web-based document retrieval techniques, and to systems and methods for retrieving, viewing, and manipulating objects in web documents. In particular, and without limitation, the present disclosure relates to systems and methods for providing improved web-based document retrieval techniques, including systems and methods for performing manipulations on objects within retrieved web documents once these objects are visible to a user.

Background Information

The Internet provides a wide array of resources and services. Among other things, the Internet enables users to access inter-linked documents of the World Wide Web (the "web"). Modern web documents, such as web pages, are able to seamlessly integrate textual information with images, streaming video, and other interactive media. Search engines enable web users to locate relevant web documents or pages. For example, upon receipt of a search query from a user, a search engine may provide the user not only hyperlinks associated with the query, but also images, videos, and additional online content, such as advertisements, that are related to the search query.

Hyperlinks enable users to navigate the World Wide Web. For example, by clicking on an article on a web site of a news provider, the user may be presented with the textual content of the article. Such information may be supplemented by images and/or one or more streaming videos related to the article.

While modern web documents can greatly expand the richness of online content available to a user, related images, streaming videos, and other additional content may increase the volume of data to be downloaded. Depending on a user's connection speed and computer resources, the user often must wait or deal with extended delays to download an entire web page.

There also other drawbacks with modern web documents. For instance, images and other additional content is rarely clustered around a single portion of a web document or page. More commonly, such content is positioned throughout the web page in order to capture the user's attention as the user scrolls through the page. However, in many instances, a user may only view a selected portion of a web page in order to obtain desired information. Moreover, while a search engine may return a large number of results and content associated with a search query, the user may only view several of these results. In such an instance, the user has downloaded all of the additional media content provided by the search engine, but has only viewed a small subset of that content.

In view of the foregoing, there is a need for improved systems and methods for selectively loading and manipulating multimedia content in a web document based on, for example, a portion of that web document visible to a user. Such systems and methods may be implemented in computer-based environments, such as the Internet and network environments that provide online content to users.

SUMMARY

Consistent with embodiments of the present invention, a computer-implemented method for manipulating objects in a web document is provided. The method identifies a portion of a retrieved web document that is displayed to a user. The identified portion includes a first boundary and a second boundary in a scrolling direction. The method then selects at least one object from the retrieved web document, and the at least one selected object is associated with a corresponding manipulation. The method detects whether a portion of the at least one selected object falls between the first and second boundaries, and then performs the corresponding manipulation of the at least one selected object when the portion of the selected object falls between the first and second boundaries.

Consistent with additional embodiments of the present invention, a apparatus having a storage device and a processor coupled to the storage device is provided. The storage device stores a program for controlling the processor, and the processor, being operative with the program, is configured to identify a portion of a retrieved web document that is displayed to a user. The identified portion includes at least a first boundary and a second boundary in a scrolling direction. The processor is further configured to select at least one object from the retrieved web document, and the at least one selected object is associated with a corresponding manipulation. The processor is configured to detect whether a portion of the at least one selected object falls between the first and second boundaries, and to perform the corresponding manipulation of the at least one selected object when the portion of the selected object falls between the first and second boundaries.

Other embodiments of the present invention relate to a computer-readable medium with stored instructions that, when executed by a processor, perform a method for manipulating objects in a web document. The method identifies a portion of a retrieved web document that is displayed to a user. The identified portion includes a first boundary and a second boundary in a scrolling direction. The method then selects at least one object from the retrieved web document, and the at least one selected object is associated with a corresponding manipulation. The method detects whether a portion of the at least one selected object falls between the first and second boundaries, and then performs the corresponding manipulation of the at least one selected object when the portion of the selected object falls between the first and second boundaries.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

DESCRIPTION OF THE EMBODIMENTS

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
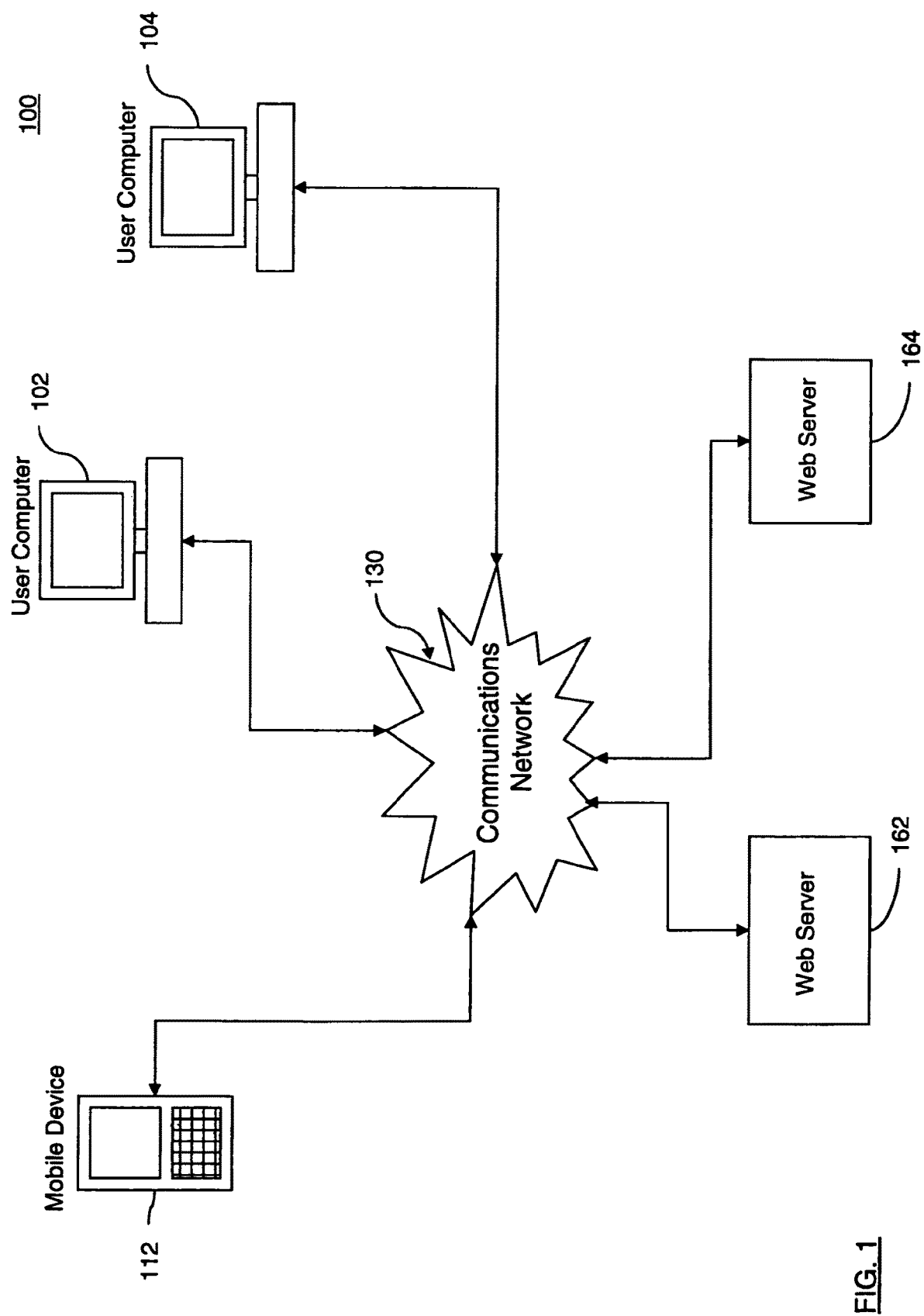
FIG. 1 is a diagram of an exemplary computing environment within which embodiments of the invention may be practiced.

FIG. 1 illustrates an exemplary computing environment 100 within which embodiments of the present invention may be practiced. In FIG. 1, web servers 162 and 164, user computers 102 and 104, and mobile device 112 are interconnected via a communications network 130. These components may perform various operations including, for example, exchanging information, transmitting requests for web documents, such as web pages, and responding to requests by retrieving and providing web documents. Although computing environment 100 includes multiple user computers and mobile devices in communication with web servers 162 and 164, persons of ordinary skill in the art will recognize that computer environment 100 may include any number of user computers, any number of mobile devices, any number of additional web servers, and any additional number of computers or servers without departing from the spirit or scope of the present invention.

Communications network 130 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 130 may also include one or more mobile device networks, such as a GSM network or a PCS network, that allow mobile devices, such as mobile device 112, to send and receive data via applicable communications protocols, including those described above.

Although not depicted in FIG. 1, web servers 162 and 164 may include a front end portion and a back end portion, which is disposed in communication with the front end portion. For example, the front end portion and the back end portion of web servers 162 and 164 may be incorporated into a hardware unit, for example, a single computer or a single server. In such an exemplary embodiment, the front end portion may be a software application, such as a web service, executing on web servers 162 and 164. However, web servers 162 and 164 are not limited to such configurations, and, in additional embodiments, the front end portion may be executed on any computer or server separate from the back end portion without departing from the spirit of scope of the present invention.

Figure 2:
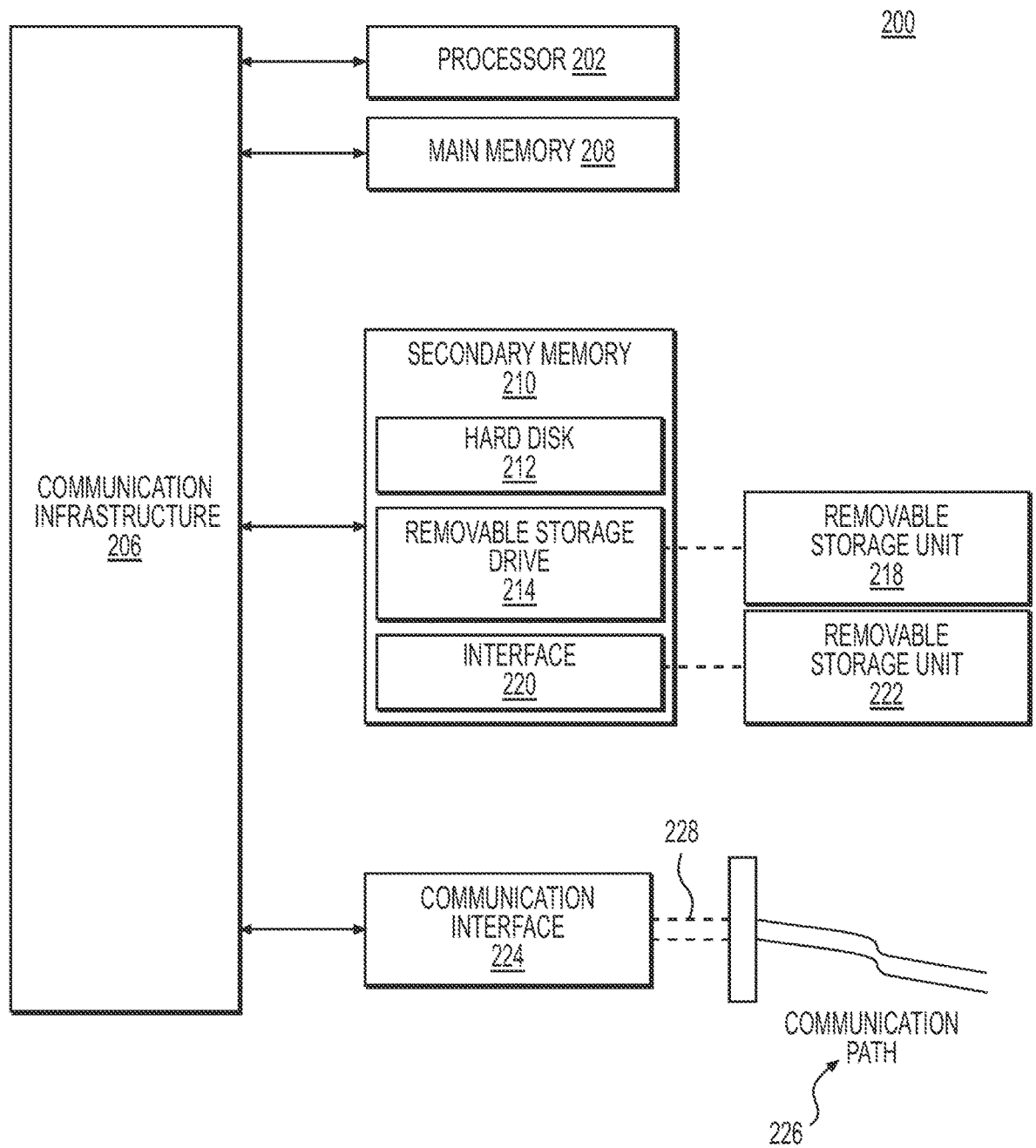
FIG. 2 is a diagram of an exemplary computer system, consistent with embodiments of the invention may be implemented.

User computers 102 and 104, and additionally, web servers 162 and 164 and mobile device 112, may represent any type of computer system capable of performing communication protocol processing. FIG. 2 is an exemplary computer system 200, according to an embodiment of the invention. Exemplary computer system 200 includes one or more processors, such as processor 202. Processor 202 is connected to a communication infrastructure 206, such as a bus or network, e.g., network 130 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other storage medium that is read by and written to by removable storage drive 214. As will be appreciated, the removable storage unit 218 can represent a computer readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment of the invention, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an interpreter.

The computer-implemented methods described herein can also be implemented on a single processor of a computer system, such as processor 202 of system 200. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

In the embodiments described herein, a user may request a web document, for example, a web page, by entering a URL into a web browser executing on a user device, such as user computer 102 or mobile device 112 of FIG. 1. Upon entry of that URL, the web browser determines an appropriate transfer protocol and requests the web document from a corresponding server computer, e.g., web servers 162 and/or 164, using the determined protocol. The server(s) may then transmit the requested web document to the user device, which receives the retrieved web document and which generally stores the retrieved web document in its entirety.

Figure 3A:
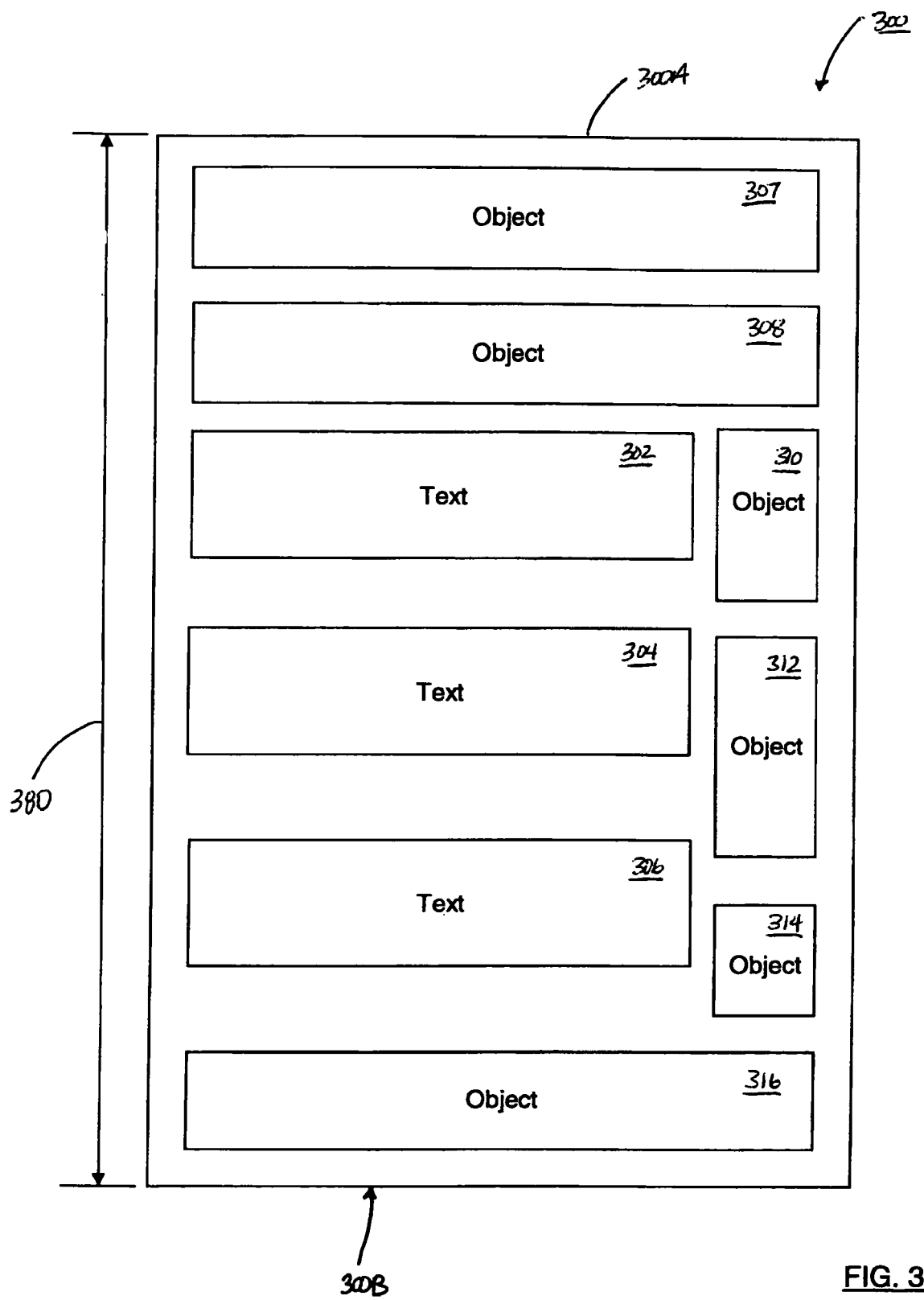
FIGS. 3A-3C illustrate features of an exemplary web document that may be selectively viewed and manipulated, according to embodiments of the invention.
Figure 3B:
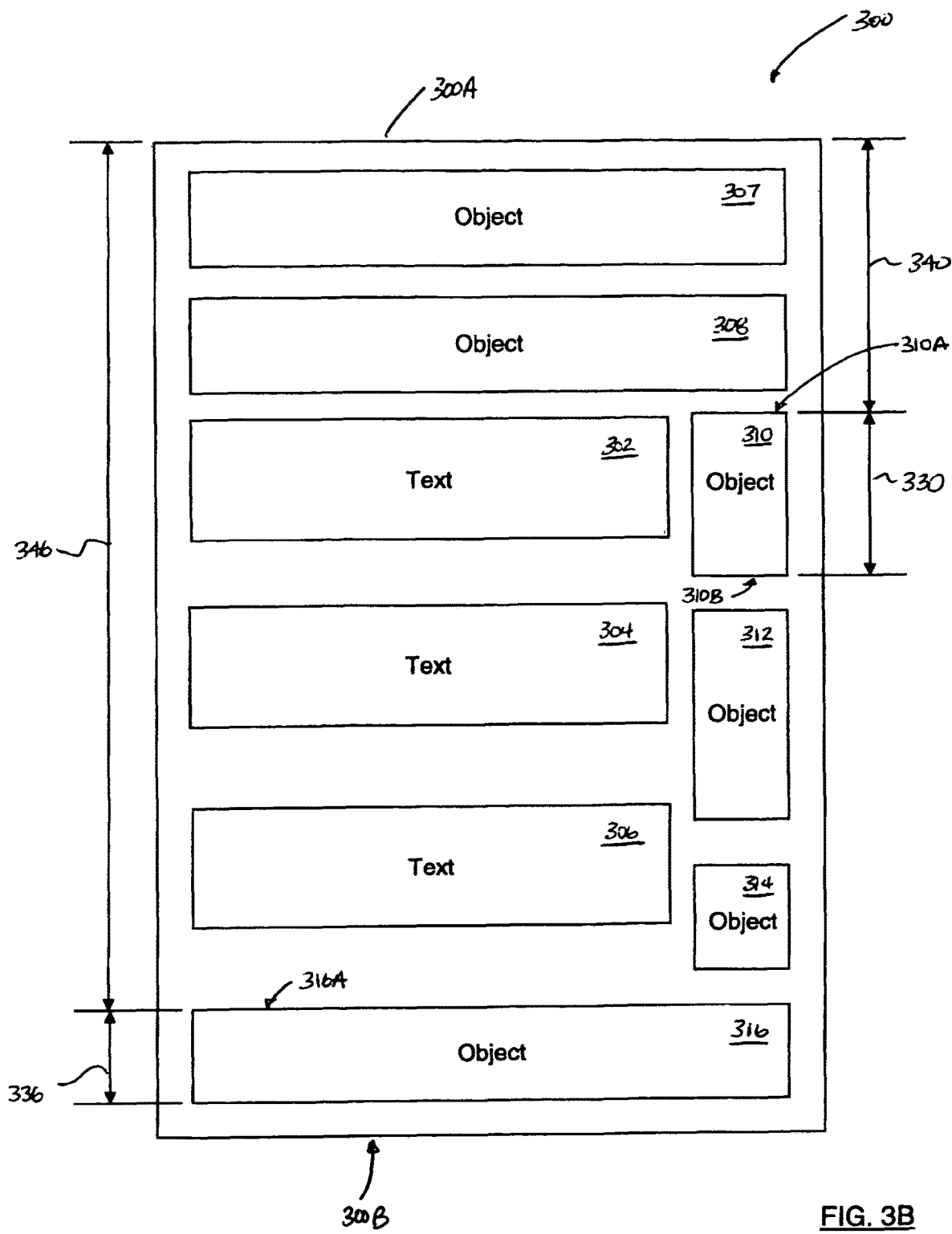
Figure 3C:
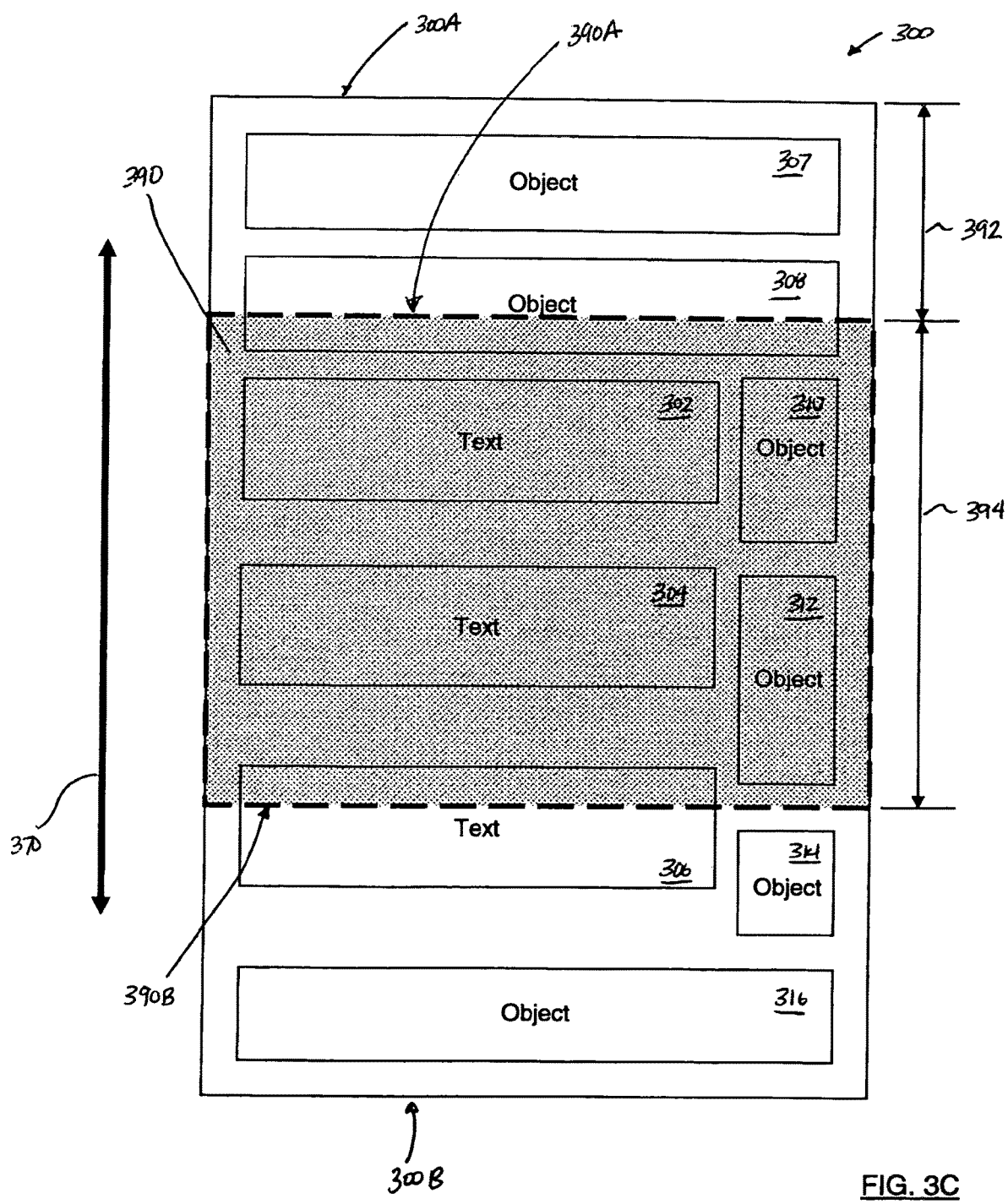

FIGS. 3A, 3B, and 3C illustrate features of an exemplary web document 300 that may be selectively viewed and manipulated, according to embodiments of the invention. In an embodiment, web document 300 can represent a web page in HTML format, a web page in XHTML format, or a web page in additional or alternate format appropriate to a user's web browser. Consistent with embodiments of the invention, web document 300 is not limited to web pages, and in additional embodiments, web document 300 may represent any of a number of retrievable documents or data, including, but not limited to email attachments in HTML or other formats, and XML-enriched documents, for example.

As depicted in FIG. 3A, web document 300 may include one or more objects, such as objects 302, 304, and 306 that, for example, may be associated with plain text and hyperlinks. Further, web document 300 may also include one or more objects, such as objects 307, 308, 310, 312, 314, and 316, that are associated with media content. In an embodiment, the media content may represent an image or an embedded link to streaming video, for example, from an additional web site. Further, for example, the media content may represent an embedded executable script, including, but not limited to, an executable JavaScript and an executable AJAX script. However, web document 300 is not limited to objects associated with such exemplary content, and in additional or alternate embodiments, web document 300 may include any number objects associated with any variety of content, without departing from the spirit or scope of the invention.

In the example FIG. 3A, web document 300 may be characterized by a body height 380 that, for example, is expressed as a number of pixels measured from an upper edge 300A of web document 300. Further, a position of each object within web document 300 may be characterized in terms of an object height and an object offset. In an embodiment, the object offset represents a displacement between an upper edge of an object and upper edge 300A of web document 300.

For example, and as depicted in FIG. 3B, a position of object 310 may be determined by object height 330 and an object offset 340, which represents a displacement between upper edge 310A of object 310 and upper edge 300A of web document 300. Further, for example, a position of object 316 within web document 300 may be determined by an object height 336 and an object offset 346, which represents a displacement between upper edge 316A of object 316 and upper edge 300A of web document 300. Further, although not depicted in FIG. 3B, similar object heights and object offsets may used to establish a position of each of objects 302, 304, 306, 307, 308, 312 and 314, and additionally, any other object present within web document 300.

In an embodiment, body height 380 of web document 300 may be substantially larger than a corresponding height of a viewport, such as a viewport of a web browser or other appropriate executable program that displays web document 300 to a user. The viewport of the web browser viewport represents an area provided by the web browser through which web document 300 is displayed to the user.

A size of a browser viewport may be limited by a corresponding size of a display associated with the user's device, e.g., a monitor or display screen. In such instances, the size of the viewport may be reduced by one or more toolbars and/or scrollbars. Further, some operating systems support multiple virtual display screens that, for example, allow the browser viewport to be larger than a corresponding display screen of the user's device.

Dimensions of the browser viewport, e.g., a width and height, may be determined using, for example, JavaScript properties. The selection of an appropriate JavaScript property may depend on, for example, the user's web browser and on the web document viewed through the viewport. Using many conventional web browsers, the height and width of the browser viewport may be determined, respectively, by the "innerHeight" and "innerWidth" properties.

However, in additional embodiments, the user's web browser and the displayed document may require an application of additional or alternate JavaScript property to determine the height and width of the browser viewport. For example, the viewport width may be determined using the "documentElement.clientWidth" and the "body.clientWidth" properties of JavaScript, and the viewport height may be determined using the "documentElement.clientHeight" and "body.clientHeight" properties of JavaScript.

For example, in FIG. 3C, a viewport 390 of the user's web browser may be able to display only a subset of web document 300, i.e., objects 302, 304, 310, and 312 in their entirety and portions of objects 306 and 308. In order to view the remainder of objects 306, 307, and 308, and in order to view objects 314 and 316, the user must scroll through web document 300 along a scrolling direction 370 to re-position viewport 390 over one or more additional portions of web document 300.

A position of viewport 390 along scrolling direction 370 may be characterized in terms of a height 394 and in terms of an offset 392. In an embodiment, offset 392 identifies a current scroll position within web document 300, and may be defined as a displacement, measured along scroll direction 370, between an upper boundary 390A of viewport 390 and upper boundary 300A of web document 300. Further, for example, both height 394 and offset 392 may be expressed in terms of a number of pixels.

Web users often download and store a requested web document, e.g., a web page, in its entirety before viewing that web document. Although these requested web documents may include static and unchanging content, a requested web pages may also feature content configured to be refreshed periodically, such as embedded advertisements. As such, not only must the entire web document be initially downloaded and stored prior to viewing a portion of that web document, but the user's web browser often submits additional requests to refresh previously-stored content, regardless of whether the user views the previously-stored content.

Figure 4:
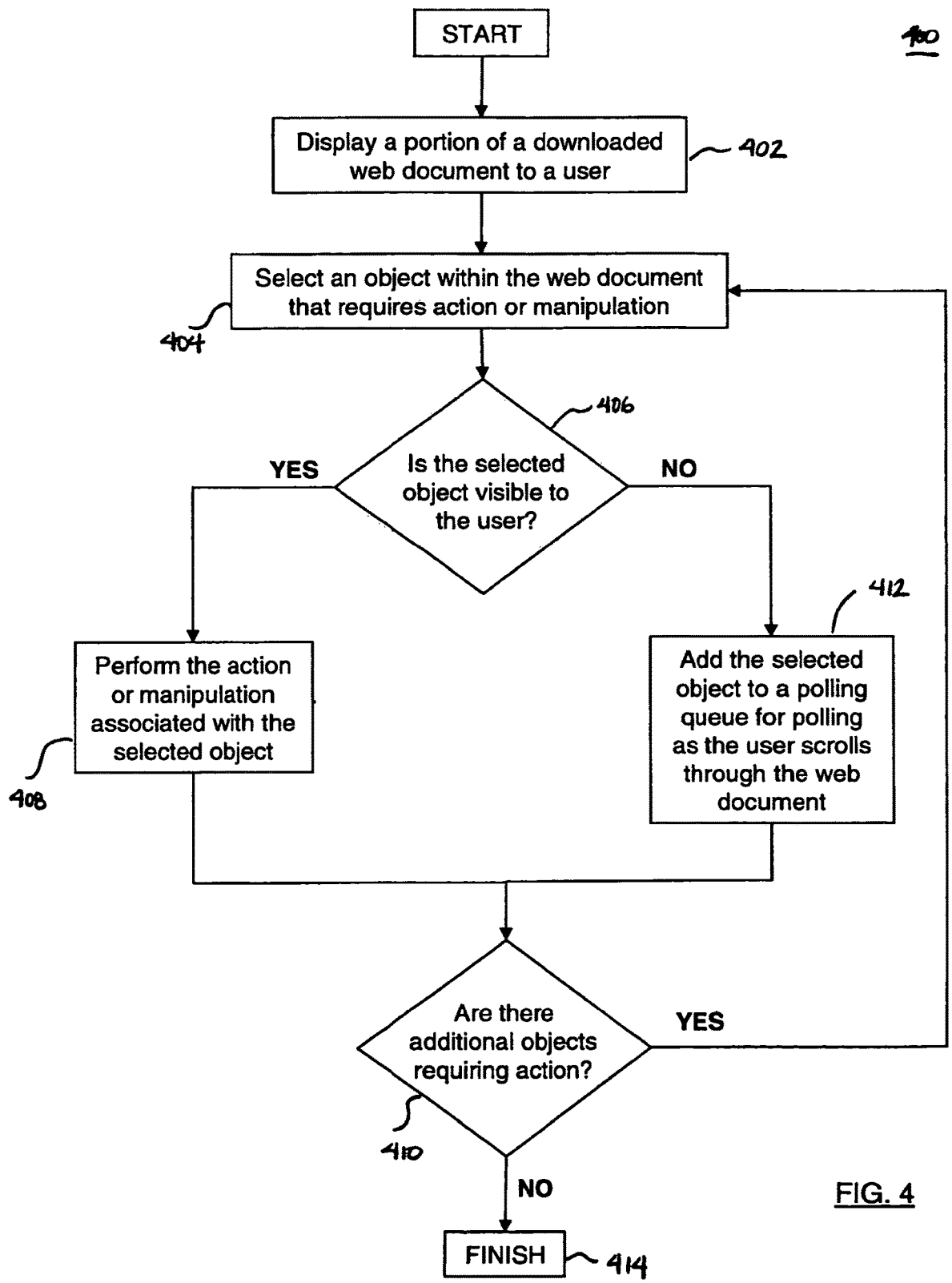
FIG. 4 is a flowchart of an exemplary method for manipulating objects within a web document, according to an embodiment of the invention.

FIG. 4 illustrates an exemplary method 400 for selectively manipulating objects within a stored web document, according to an embodiment of the invention. In step 402, a portion of a stored web document is displayed to a user through a viewport of a web browser, e.g., viewport 390 of FIG. 3C. In an embodiment, the stored web document may represent a web page that includes one or more objects, each of which are downloaded and stored in their entirety. For example, these objects may represent one or more digital images, streaming video, Flash media content, and executable scripts (e.g., JavaScript or AJAX). Additional or alternate content can also be provided, as will be apparent to a person of skill in the art without departing from the spirit or scope of the invention.

In step 404, an object of the web document is selected that is associated with a corresponding action or manipulation. For example, the object selected in step 404 may represent an advertisement within the stored web document that is scheduled to be refreshed by the user's web browser. However, the selected object is not limited to refreshable advertising content, and in additional embodiments, the selected object may be associated with any of a variety of downloadable content, including, but not limited to still images, streaming media, and Flash media. Further, the particular action is not limited the retrieval of online content, and additionally or alternatively, the corresponding manipulation may represent an execution of an corresponding script or function, e.g., in JavaScript or AJAX format.

In step 406, a determination is made as to whether the selected object is currently visible to the user through the viewport of the user's web browser. For example, as part of step 406, the selected object may be determined to be "visible" to the user when the selected object falls entirely within the viewport of the user's web browser, i.e., when the boundaries of the selected object fall entirely between the boundaries of the viewport.

In an additional embodiment, a less restrictive definition of "visibility" is used as part of step 406. For example, as part of step 406, the selected object may be deemed to be "visible" to the user when any portion of the selected object is visible to the user through the viewport, i.e., when at least a portion of the selected object falls between the boundaries of the viewport.

Additionally, or independently, step 406 may also deem the selected object visible to the user when at least a portion of that selected object falls within a threshold detection distance of the boundaries of the viewport. For example, step 406 may artificially expand the boundaries of the viewport according to the threshold detection distance, and may deem the selected object as being visible to the user when the selected object falls entirely within the expanded boundaries of the viewport. Further for example, step 406 may deem the selected object as visible to the user when any portion of that selected object falls within the expanded boundaries of the viewport. In such an embodiment, step 406 may not only identify objects within the web document that are currently visible to the user, but may also identify objects that are likely to become visible in response to an action by the user, for example, in response to scrolling through the web document.

If it is determined that the selected object is visible to the user (step 406; Yes), then the process proceeds to step 408 to perform a corresponding manipulation associated with the selected object. For example, step 408 may refresh the downloaded content associated with the selected object by requesting and retrieving corresponding updated content from a web server, e.g., web servers 162 and 164 of FIG. 1.

However, step 408 is not limited to refreshing downloaded content, and in additional embodiments, step 408 may execute a corresponding script or function associated with the selected object. For example, step 408 may execute a JavaScript that embeds a Flash media player in a position within the web document corresponding to the selected object.

Once step 408 performs the corresponding manipulation of the selected object, step 410 determines whether additional objects in the web document require action or manipulation. For example, step 410 may determine whether downloaded content associated with one or more additional objects in the stored web document need to be refreshed. In such an embodiment, method 400 passes from step 410 back to step 404, which selects an additional object for processing. However, if it is determined that no additional objects within the stored web document require additional action or manipulation (step 410; No), then method 400 is complete and finishes at step 414.

Referring again to step 406, if it is determined that the selected object is not currently visible to the user (step 406; No), then no corresponding manipulation of the selected object is performed, and at step 412 the selected object is added to a polling queue for additional analysis in response to user action, e.g., in response to the user scrolling through an additional portion of the web document. In an embodiment, the polling queue associated with step 412 includes one or more objects of the web document that are not visible through the viewport at a current scroll position. For example, in reference to FIG. 3C, step 412 may add objects 314 and 316 to the polling queue, since these object may not visible to the user through viewport 390. As the user scrolls through the web document, and the position of viewport 390 translates through the web document, objects within the polling queue are "polled" to detect whether the polled objects are visible to the user and, once visible, to perform a manipulation of each visible "polled" object.

In an embodiment, step 412 may add an identifier associated with the selected object to the polling queue and may specify a threshold distance for the detection of visible polled objects. Further, in an additional or independent embodiment, step 412 may also specify a call-back function associated with the selected object, and step 412 may add this call-back function to the polling queue. In an embodiment, the call-back function, e.g., a JavaScript or AJAX function, is associated with the polled object and is executed once that polled object is deemed visible to the user.

For example, a call-back function added to the polling queue may represent a JavaScript that embeds a Flash media player into the web document at a position in the web document corresponding to the polled object. In such an embodiment, once the polling process deems that the polled object is visible to the user, the call-back function is executed to embed the Flash player.

Once the selected object is added to the polling queue in step 412, method 400 passes to step 410 to determine whether additional objects in the stored web document require manipulation. As described above, if step 410 determines that additional objects in the web document require manipulation, e.g., the refreshment of stored online content, then step 404 selects an additional object for processing. However, if step 410 determines that no additional objects within the stored web document require additional, then method 400 is complete at step 414.

In contrast to conventional systems and methods for web-based document retrieval, exemplary method 400 only initiates additional action related to an object in the stored web document, e.g., downloading additional content or executing a script or function, when that object is visible to the user through the viewport of the user's web browser. Although the user experiences a communications overhead when downloading and storing the requested web document, the exemplary embodiment of method 400 can reduce additional overhead resulting from the manipulation of a stored object not currently visible to the user through the user's browser viewport.

Figure 5:
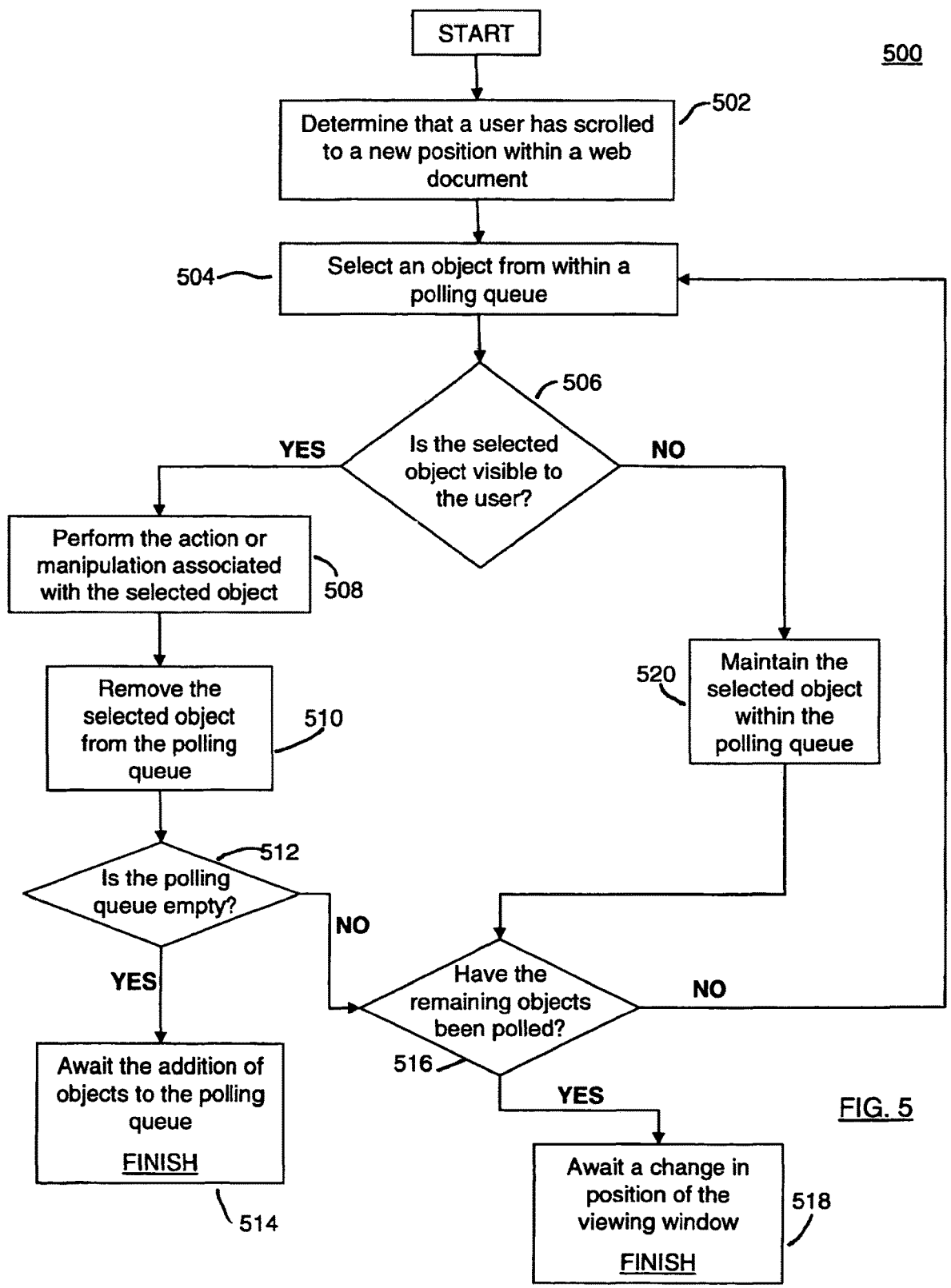
FIG. 5 is a flowchart of an exemplary method for polling objects within a polling queue, according to an embodiment of the invention.

FIG. 5 illustrates an exemplary method 500 for polling objects stored within a polling queue, according to an embodiment of the invention. In an embodiment, method 500 may be implemented as part of step 412 of FIG. 4 to poll those selected objects that are added to the polling queue. However, in additional embodiments, method 500 may be independently employed to poll objects within, for example, a pre-existing polling queue or any additional or alternate set of objects in a web document.

In FIG. 5, step 502 determines that a user has scrolled to a new position within a web document, i.e., that the current scroll position has changed, and identifies that new scroll position. Step 504 then initiates the polling process by selecting one of the polled objects from within the polling queue for further processing and analysis.

Step 506 then determines whether the polled object is now visible to the user at the new scroll position. As described above in reference to step 406 of FIG. 4, step 506 may deem the selected polled object "visible" to the user when the polled object falls entirely within the viewport of the user's browser, i.e., when the boundaries of the selected object falls entirely between the boundaries of the viewport. However, step 506 may incorporate a less restrictive definition of "visibility." For example, step 506 may deem the selected object "visible" to the user when any portion of that selected object is visible to the user through the viewport, i.e., at least a portion of the selected object falls within the boundaries of the viewing screen. Additionally, or independently, step 506 may also deem the selected object as visible to the user when at least a portion of that selected object falls between a threshold detection distance of the boundaries of the viewport, as described above in reference to FIG. 4.

If step 506 determines that the polled object is visible to the user through the newly-positioned viewport, then step 508 performs a corresponding manipulation of the polled object. For example, the corresponding manipulation may include requesting updated content from a web sever to refresh previously-stored content associated with the polled object.

Additionally or independently, step 508 may execute a call-back function associated with the polled object when step 506 deems the polled object visible to the user. For example, the call-back function may represent a JavaScript that embeds a Flash media player into the web document. However, the call-back function is not limited to such executable scripts, and in additional embodiments, step 508 may execute any of a number of appropriate call-back functions expressed in JavaScript format, AJAX format, or in any additional or alternate format, without departing from the spirit and scope of the present invention.

Once step 508 performs the corresponding manipulation, then step 510 removes the polled object from the polling queue. Step 512 then determines whether the polling queue includes additional objects. If step 512 determines that the polling queue includes no additional objects, i.e., that the polling queue is empty, then method 500 is complete in step 514. In such an embodiment, the polling process awaits the addition of one or more additional objects to the polling queue through, for example, the processes described above in reference to step 412 of FIG. 4.

However, if step 512 determines that the polling queue is not empty, then step 516 determines whether these remaining objects have been polled at the new scroll position. If additional objects require polling at the new scroll position, then method 500 passes back to step 504, which selects an additional object from the polling queue. If, however, step 516 determines that all object in the polling queue have been polled at the new scroll position, then method 500 is complete in step 518. In such an embodiment, the polling process remains dormant until the user scrolls through the web document, thereby changing the scroll position and the position of the viewport within the web document, at which time the polling process 500 is re-initialized in steps 502 and 504.

Referring back to step 506, if the selected polled object is not visible to the user, then method 500 passes to step 520, which maintains the selected object within the polling queue for further processing, for example, when the scroll position changes. Method 500 then passes to step 516, which determines whether additional objects remain to be polled at the current scroll position. If additional objects require polling, then method 500 passes back to step 504, which selects an additional object from the polling queue. If, however, step 516 determines that all object in the polling queue have been polled, then method 500 is completed in step 518, as described above.

The polling process described above in reference to the exemplary embodiments of FIGS. 4 and 5 not only perform manipulations (e.g., refreshing content and executing scripts) associated with a currently-visible object, but these polling processes may also provide a mechanism for automatically manipulating additional objects in the web document when those objects become visible to the user. For example, the exemplary methods of FIGS. 4 and 5 may allow for an automatic execution of call-back functions related to objects as these objects become visible, thereby reducing unnecessary communications overhead related to manipulating objects not actually visible to the user.

In the embodiments of FIGS. 4 and 5, the requested web document is downloaded by the user device and stored at that user device in its entirety, and stored objects are selectively manipulated when these objects become visible to the user. However, as described above, only a small fraction of users view a requested web document in its entirety. Thus, while the exemplary methods of FIGS. 4 and 5 may reduce additional communications overhead associated with manipulating objects not visible to the user, these exemplary method may still require the user to initially download the entire requested web document.

Figure 6:
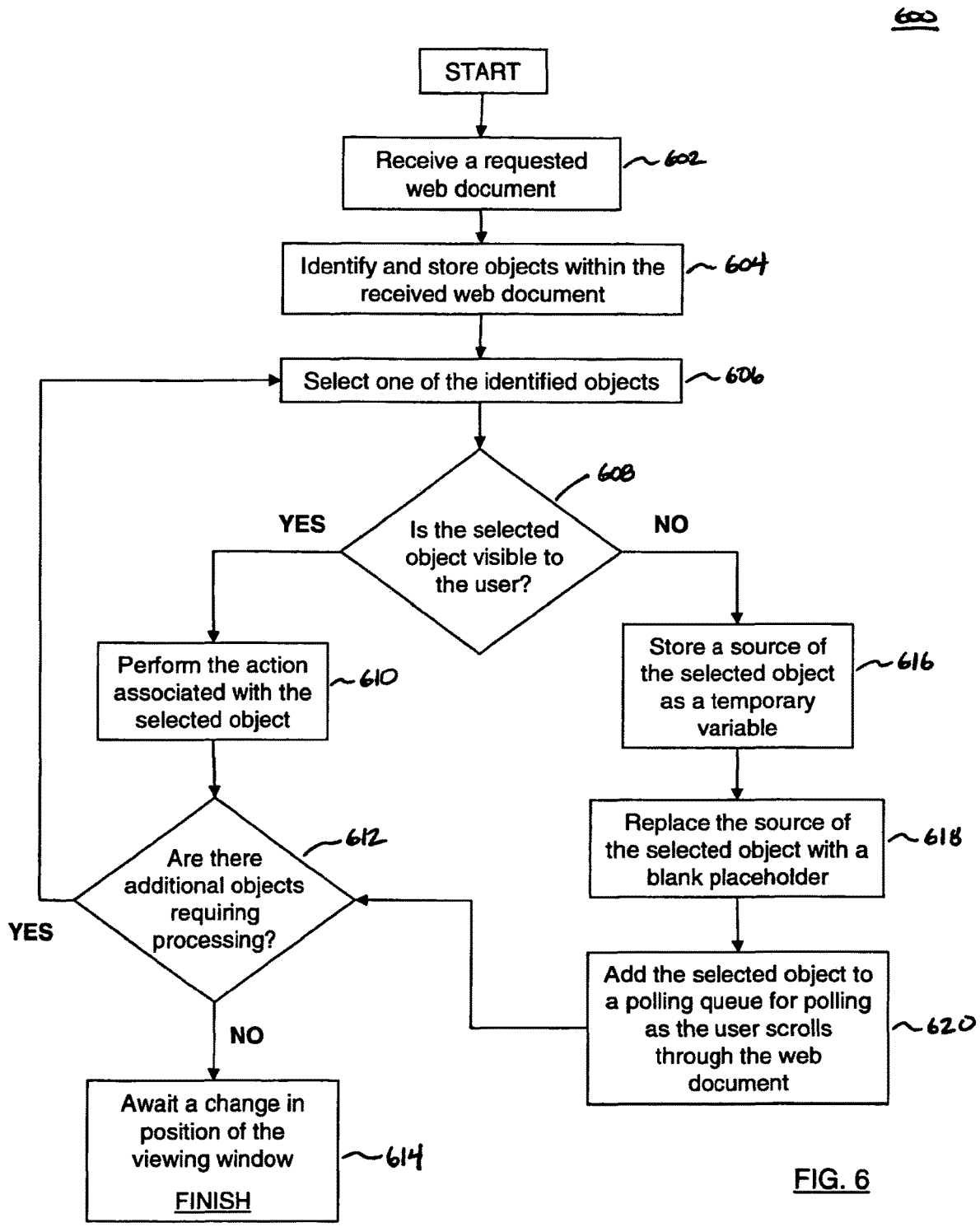
FIG. 6 is a flowchart of an exemplary method for selectively downloading objects associated with a retrieved web document, according to an embodiment of the invention.

FIG. 6 illustrates an exemplary method 600 for selectively downloading objects associated with a retrieved web document, according to an embodiment of the invention. In an embodiment, and in contrast to the exemplary methods of FIGS. 4 and 5, method 600 retrieves a requested web document from a web server, and only downloads those objects that would be visible to a user at a current scroll position. In such an embodiment, method 600 can reduce both an overall download time and a connection bandwidth required to obtain and view a requested web document.

In step 602, a user device (e.g., user computer 102 or mobile device 112 of FIG. 1) retrieves a requested web document from a web server (e.g., web servers 162 and 164 of FIG. 1). In an embodiment, the received web document may represent a web page in HTML or XHTML format. However, the retrieved Web document is not limited to such web pages, and in additional embodiments, the user device may a requested a web document in any number of additional or alternate appropriate forms, without departing from the spirit or scope of the present invention.

Upon receipt of that requested web document, step 604 processes the received web document to identify one or more objects in the retrieved web document prior to downloading or otherwise manipulating these objects. In an embodiment, step 604 may identify the one or more objects based on a HTML tag associated with each of the one or more objects. For example, step 604 can identify each object in the retrieved web document having a HTML tag corresponding to an embedded image. In additional embodiments, step 604 may also identify each object in the retrieved web document associated with an executable script, including, but not limited to, scripts in JavaScript or AJAX format, e.g., a script that embeds a Flash media player into the retrieved web document.

Furthermore, the processing of step 604 is not limited to identifying objects of a single type, e.g., images or functions. For example, step 604 may be configured to identify any combination of one or more types of objects positioned within the received web document. In such embodiments, a web developer may configure the processing of step 604 to identify those objects that are require substantial time and/or bandwidth to load, while allowing less time- and bandwidth-consuming objects to be immediately downloaded at the user device.

Moreover, step 604 is not limited to identifying only a subset of the objects in the retrieved web document. In additional embodiments, step 604 may be configured to identify each object in the retrieved web document, regardless of object type, before downloading these identified objects.

In step 606, one of the identified objects is selected for additional processing. Step 608 subsequently detects whether the selected object is visible to the user through a viewport, e.g., viewport 390 of FIG. 3C, of a user's web browser at a current scroll position. In an embodiment, step 608 may determine that the selected object is visible through the viewport if that selected object falls entirely within the boundaries of the viewport. For example, and in reference to FIG. 3C, step 608 may determine that objects 302, 304, 310 and 312 are visible to since each of these objects falls entirely within the boundaries of viewport 390.

However, step 608 is not limited to such definitions of object visibility, and in an additional embodiment, the detection of step 608 may incorporate a less stringent definition of object visibility. For example, step 608 may determine that the selected object is visible to the user if any portion of that selected object falls within the boundaries of the viewport. For example, and in reference to FIG. 3C, step 608 may determine that objects 302, 304, 310, and 312 are visible to the user, as each falls entirely within the boundaries of the viewport, and additionally, that objects 306 and 308 are visible since a portion of these objects fall within the viewport.

Further, step 608 may determine that the selected object is visible to the user if at least a portion of that selected object falls within a threshold detection distance of the boundaries of the viewport. In such an embodiment, the upper and lower boundaries of the viewport may be displaced by a distance equivalent to the threshold detection distance to form "expanded" boundaries, thereby creating an "effective" viewing area that incorporates both objects present visible to the user, and objects that may soon become visible to the user when the user scrolls through the web document.

The threshold detection distance may be specified by the user, or alternatively, the threshold detection distance may be based on a pre-determined default distance established, for example, by the web developer. In such exemplary embodiments, the threshold detection distance and default distance may be expressed in pixels, or alternatively, in any other appropriate unit of measure without departing from the spirit of scope of the present invention.

If step 608 determines that the selected object is "visible" to the user, i.e., entirely visible or partially visible, then a corresponding manipulation is performed on the selected object in step 610. For example, if the selected object were an image, then the image corresponding to the selected object would be downloaded from the web server and stored locally. The downloaded image could then be displayed using the web browser as an embedded image within the web document.

Moreover, in an additional embodiment, step 610 may execute a function associated with the selected object to embed, for example, multimedia content, into a position within the web document corresponding to the selected object. For example, the function may represent a script, e.g., in JavaScript or AJAX format, that embeds a Flash Media Player into the position within the web document corresponding to the selected object. However, the function is not limited to such exemplary functionalities, and in additional embodiment, the function may represent an executable script in any additional or alternate format, as would be apparent to one of skill in the art.

Once the corresponding manipulation has been performed in the selected object in step 610, step 612 determines whether additional objects require processing. If no additional objects require processing in step 612, then the exemplary method is complete in step 614. In such an embodiment, method 600 waits for the user to scroll through the web document, thereby changing the current scroll position in the web document and changing a position of the viewport. However, if step 612 determines that additional objects require processing, exemplary method 600 passes back to step 606, which selects an additional object for processing.

If step 608 determines that the selected object is not currently visible to the user, then method 600 passes to step 616, which stores a source of the selected object as a temporary variable, e.g., a temporary Java property of that selected object. Step 618 then replaces the source of the selected object with a blank placeholder that temporarily blocks the download of that selected object.

In an embodiment, the replacement in step 618 may depend on both a type of the selected object, e.g., an image, and on a web browser of the user. For example, if the selected object were an image, then step 618 could replace the source of the selected object with a blank image, for example, when the user's web browser is a Firefox web browser, and additionally or alternatively, step 618 could replace the source of the selected object with a blank character string, for example, when the user's web browser is Internet Explorer. However, step 618 is not limited to such exemplary replacements, and in additional embodiments, step 618 may replace the source of the selected object with any additional or alternate placeholder to block the download of the selected object, without departing from the spirit or scope of the invention.

Once the download of the selected object is blocked by steps 616 and 618, the selected object is added to a polling queue in step 620 for future action once the selected function becomes visible within the viewport. For example, step 620 may incorporate the exemplary polling processes described above in reference to FIG. 5 to process the selected objects within the polling queue as the user scrolls through the received web document. For example, the polling process of step 620 detects which, if any, of the queued objects becomes visible to the user through as the user scrolls through the web document, and in response to this detection, the polling process would replace the placeholder with the true source of the newly-visible object and would perform a corresponding manipulation on the newly-visible object.

Once the selected object is added to the polling queue, method 600 then passes to step 612, which determines whether additional objects require processing. If step 612 determines that no additional objects require processing, then method 600 is complete in step 614. However, if step 612 determines that additional object require processing, then method 600 passes back to step 606, which selects an additional object for processing.

In the embodiments described above, method 600 may download objects associated with a received web document when those objects are visible to the user. Therefore, in contrast to conventional systems and methods of web-based document retrieval, exemplary method 600 dynamically downloads and manipulates content associated with a received document in response to user demand, e.g., when the content is visible to the user. As such, exemplary method 600 can reduce a waiting time and a connection bandwidth necessary to load a retrieved web document, as an amount of data requested by the user's web browser is linked directly to the user's viewing preferences.

Figure 7:
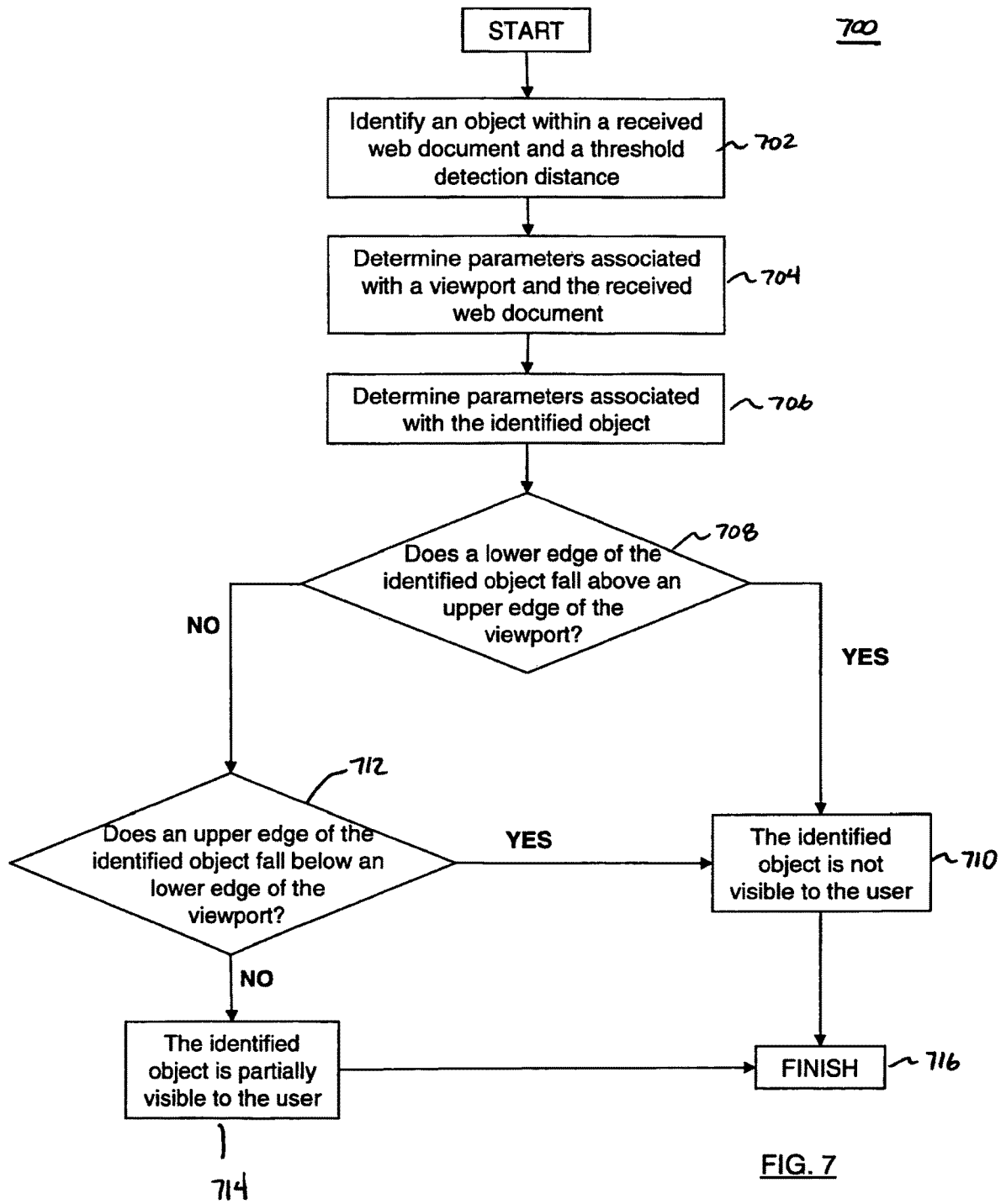
FIG. 7 is a flowchart of an exemplary method for detecting objects visible in a retrieved web document, according to an embodiment of an invention.

FIG. 7 illustrates an exemplary method 700 for detecting visible objects in a retrieved web document, according to an embodiment of an invention. In an embodiment, method 700 may be incorporated into any of the exemplary methods described above in reference to FIGS. 4-6 to detect whether an identified object or objects are visible to a user through a viewport of a web browser. However, the exemplary processes of FIG. 7 are not limited to such implementations, and in additional embodiments, method 700 may be implemented independently or in conjunction with any additional process, without departing from the spirit or scope of the invention.

In FIG. 7, step 702 identifies an object from within a retrieved web document, e.g., a HTML web page. In an embodiment, the identified object may represent an image embedded within the web document, and additionally or alternatively, the identified object may also reference a function that, for example, embeds a Flash media player into a position in the web document associated with the identified object. For example, such function can be defined in JavaScript format, in AJAX format, or in any additional or alternate format appropriate to the user's web browser.

Further, step 702 also identifies one or more detection parameters, including, but not limited to a threshold detection distance. In an embodiment, the identified threshold detection distance may be applied to "expand" each boundary of the viewport of the user's web browser to allow the detection of objects that that fall within the specified threshold detection distance of the viewport. In an embodiment, the threshold detection distance may be specified as a non-zero number of pixels. However, in an additional embodiment, the user may specify a zero-pixel threshold value, thereby limited the detection of object that at least partially fall within the original boundaries of the viewport.

Step 704 then determines one or more parameters associated with the retrieved web document. For example, step 704 may determine a dimension of the web document in the scrolling direction, i.e., a body height of the web document (e.g., body height 360 of web document 300 of FIG. 3A).

Step 704 also determines one or more parameters associated with the viewport of the user's web browser. For example, step 704 may determine a height associated with the viewport of the user's web browser (e.g., height 394 of viewport 390 in FIG. 3C) and a current scroll position that defines a position of the viewport (e.g., offset 392 of viewport 390 of FIG. 3C) within the retrieved web document.

In an embodiment, the parameters determined in step 704 may be computed using one or more JavaScript properties. For example, the body height of the web document may using the "offsetHeight" property of JavaScript. In such an embodiment, the application of the "offsetHeight" property to the web document would return a total linear height of the web document, measured in pixels.

Further, for example, step 704 may employ one or more additional JavaScript properties to obtain a height of the viewport of the user's web browser. For example, an application of the "innerHeight" property to a variable representing the viewport returns a height of the viewport in pixels, including, for example, a height of a horizontal scroll bar associated with the viewport.

However, the determination of the height of the user's browser viewport is not limited to the "innerHeight" property. For example, the user device may be executing a web browser that fails to support the "innerHeight" property. In such embodiments, step 704 may determine the height of the user's browser viewport using any additional or alternate property of JavaScript, including, but not limited to, the "body.clientHeight" property and the "documentElement.clientHeight" property.

Step 704 may also employ one or more one or more JavaScript properties to compute the current scroll position within the web document. For example, the scroll position may be determined by applying the "documentElement.scrollTop" property to a variable representing the web document in order to determine the scroll position in pixels.

However, as described above, not all web browsers support the functionality of the "documentElement.scrollTop" property. In such embodiments, step 704 may employ one or more JavaScript properties, either alone or in combination, to compute the scroll position in a manner compatible with most web browsers. For example, step 704 may apply one or more of the "pageYOffset" property and the "body.scrollTop" property to a variable associated with a web document to determine the scroll position within the web document.

Step 706 then determines one or more parameters associated with the identified object, including, but not limited to, a height of the identified object (e.g., height 320 of object 310 of FIG. 3B) and a corresponding offset associated with the identified object (e.g., offset 330 of object 310 of FIG. 3B). As described above in reference to FIG. 3B, the corresponding offset may be defined as a displacement between an upper edge of the identified object and an upper edge of the web document. Further, as described above, a combination of the object height and object offset may define a position of the identified object in a scrolling direction of the retrieved web document.

In an embodiment, step 706 may apply JavaScript properties, including, but not limited to, the "offsetHeight" property described above, to compute the height in pixels of the identified object. Moreover, step 706 also computes the position of the identified object within the received web document. However, in contrast to the scroll position described above, the position of the identified object within a web document remains unchanged unless additional information is added to the web document, thereby changing the body height of the web document.

In an embodiment, step 706 leverages these properties of the object position in order to reduce a number of computational cycles necessary to determine whether the identified object is visible through the viewport. In such an embodiment, step 706 recycles a previously-computed position of the identified object, if such a previously-computed position exists, unless a height of the received web document has changed since the last computation.

Figure 8:
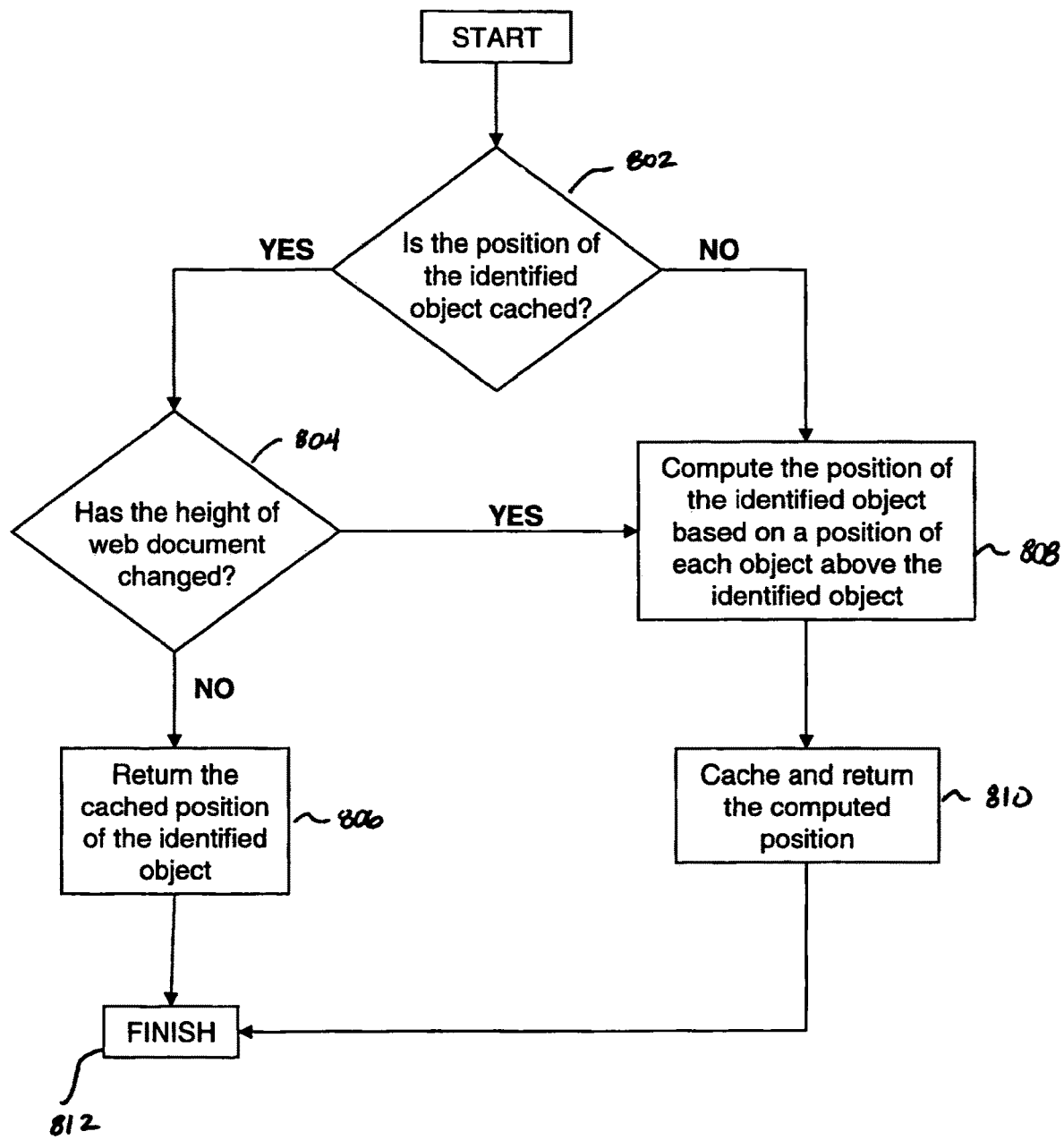
FIG. 8 is a flowchart of an exemplary method for computing a position of an identified object within a web document, according to an embodiment of the invention.

FIG. 8 illustrates an exemplary method 800 for computing a position of an identified object within a web document, according to an embodiment of the invention. By way of example, the method of FIG. 8 may be incorporated into step 706 of FIG. 7. However, in an additional embodiment, exemplary method 800 may be implemented or otherwise incorporated into a process independently of step 706, without departing from the spirit or scope of the invention.

Step 802 determines whether a position of the identified object has been previously computed and cached for future use. If step 802 determines that a cached version of the position exists, then method 800 passes to step 804, which determines whether a height of the web document that includes the identified object has changed since the position of the identified object was computed. If step 804 determines that the height of the web document is unchanged, the step 806 uses the cached position as the position of the identified object, and method 800 is completed in step 812. In an embodiment, step 806 returns the cached position of the identified object to step 706 of FIG. 7 for additional processing.

However, if step 804 determines that the height of the web document has changed since the cached position was computed or, alternatively, if step 802 determines that no cached position has been computed, then step 808 computes the position of the identified object. In an embodiment, step 808 may compute the position of the identified object within the web document, e.g., displacement 320 of object 310 in FIG. 3B, based on a relative position of each object positioned in the web document above the identified object. For example, step 808 can loop through each object in the web document above the identified object and compute a relative position of each object using the JavaScript property "offsetTop." These relative positions may then be summed to yield the position of the identified object within the web document.

The computed position of the identified object is subsequently cached for future access in step 810, along with, for example, a height of the web document at the time of computation, and method 800 is completed in step 814. As described above, the computed position of the identified object may be returned to step 706 of FIG. 7 for additional processing.

Referring back to FIG. 7, once the parameters related to the viewport and the received web document are computed in step 704, and the parameters related to the identified object are computed in step 706, step 708 then determines whether a lower edge of the identified object (e.g., edge 310B of object 310 in FIG. 3B) falls above an upper edge of the viewport (e.g., upper edge 390A in FIG. 3C). In an embodiment, the upper boundary of the viewport used in the determination of step 708 may be expanded upward to account for the identified threshold detection distance, as described above.

For example, step 708 may test whether the following expression is satisfied:

$$\text{lower\_edge\_identified\_object} < \text{upper\_edge\_viewing\_window}, \quad (1)$$

wherein:

$$\text{lower\_edge\_identified\_object} = \text{object\_position} + \text{object\_height; and} \quad (2)$$

$$\text{upper\_edge\_viewing\_window} = \text{scroll\_position} - \text{threshold\_distance}. \quad (3)$$

In Equations (1)-(3), lower_edge_identified_object represents a position of the lower edge of the identified object measured relative to the upper edge of the web document, and upper_edge_viewing_window represents a scroll position within the web document adjusted to account for the threshold distance.

Further, object_position and object_height in Equation (2) represent, respectively, the position of the upper edge of the identified object within the web document and the height of the identified object. In an embodiment, these values may be determined using the techniques described above in reference to step 706. In Equation (3), scroll_position represents a current scroll position within the web document, as described above in reference to step 704, and threshold_distance represents the threshold detection distance identified in step 702.

If step 708 determines that Equation (1) is satisfied, then the lower edge of the identified object falls above an upper edge of the viewport, as adjusted to account for the threshold distance. Accordingly, step 710 then determines that the identified object is positioned above the user's browser viewpoint, and that the identified object is not visible to the user. Method 700 is then completed in step 716.

However, if step 708 determines that Equation (1) is not satisfied, then step 712 determines whether the upper edge of the identified object (e.g., edge 310A of object 310 in FIG. 3B) falls below the lower edge of the viewport (e.g., edge 390B of viewpoint 390 in FIG. 3C). Similar to the embodiment described above, the lower boundary of the viewport used in the determination of step 712 may be displaced to account for the identified threshold detection distance. In such an embodiment, step 712 may test whether the following expression is satisfied:

$$\text{upper\_edge\_identified\_object} > \text{lower\_edge\_viewing\_window}, \quad (4)$$

wherein:

$$\text{upper\_edge\_identified\_object} = \text{object\_position; and} \quad (5)$$

$$\text{lower\_edge\_viewing\_window} = \text{scroll\_position} + \text{viewing\_window\_height} + \text{threshold\_distance}. \quad (6)$$

In Equations (4)-(6), upper_edge_identified_object represents an upper edge of the identified object measured relative to the upper edge of the web document, and lower_edge_viewport represents a lower edge of the viewport, which may be expanded to account for the threshold detection distance. Further, in Equation (6), viewing_window_height represents the height, in pixels, of the user's browser viewport, as described above in reference to step 704.

If step 712 determines that Equation (8) is satisfied, then the upper edge of the identified object is positioned below the lower edge of the user's browser viewport. Therefore, no portion of the identified object falls within the threshold distance of the viewport, and method 700 passes to step 710, which determines that the identified object is not visible to the user through the viewport of the user's web browser.

However, if step 712 determines that Equation (8) is not satisfied, then at least at least a portion of the identified object falls within the boundaries of the user's browser viewport, which may have been expanded to account for the threshold detection distance. Accordingly, step 714 determines that the identified object is visible to the user through the viewport of the user's web browser, and method 700 is completed in step 716.

In the embodiment described in FIG. 7, an identified object is "visible" to the user if any portion of that identified object falls within the threshold distance of the viewport. However, the detection processes of FIG. 7 are not limited to such a definition of a "visible" object.

Figure 9:
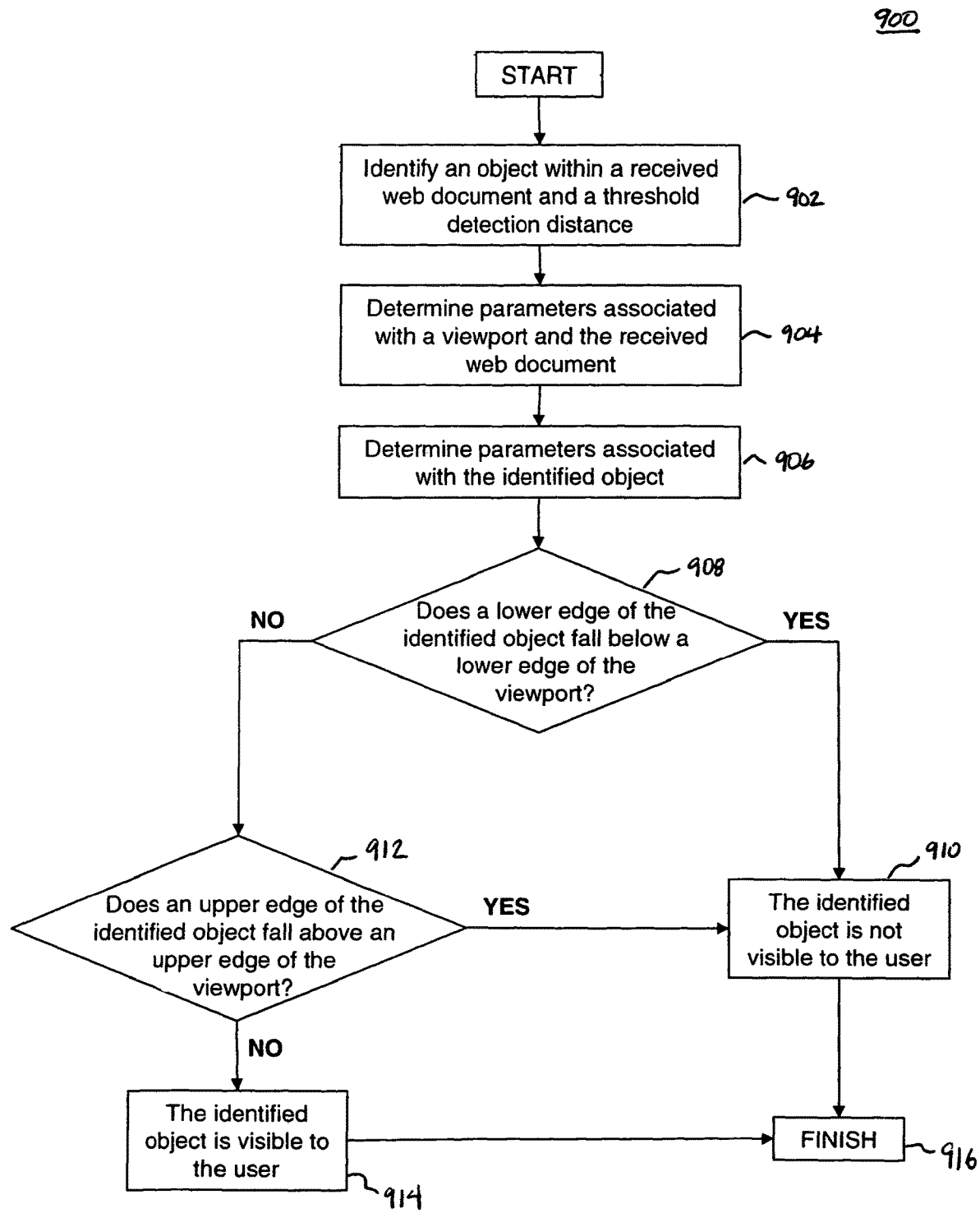
FIG. 9 is a flowchart of an exemplary method for detecting objects visible in a retrieved web document, according to an additional embodiment of an invention.

FIG. 9 illustrates an exemplary method 900 for detecting objects in a web document that are entirely visible through a user's browser viewport, according to an embodiment of the invention. In contrast to the embodiment of FIG. 7, method 900 deems an identified object as "visible" if the identified object falls entirely within the edges of the user's browser viewport, which, as described above, may be expanded to account for the threshold detection distance.

In FIG. 9, step 902 identifies an object from within a retrieved web document, e.g., a HTML web page. As described above, the identified object may represent an image embedded within the web document, and additionally or alternatively the identified object may also reference a function that, for example, embeds a Flash media player into a position in the web document associated with the identified object. Such functions may be defined in JavaScript format, in AJAX format, or in additional format appropriate to the user's web browser.

Further, step 902 also identifies one or more detection parameters, including, but not limited to a threshold detection distance. As described above in reference to FIG. 7, the identified threshold detection distance may be applied to "expand" the edges of the user's browser viewport to allow the detection of objects that that fall within the specified threshold detection distance of that viewport.

One or more parameters related to the received web document and the viewport of the user's web browser are then determined in step 904. Similar to the methods described above in reference to FIG. 7, step 904 may compute a body height of the web document (body_height), a height of the browser viewport (viewport_height), and a current scroll position within the web document, (scroll_position). In an embodiment, step 904 may compute the parameters using one or more JavaScript properties, as described above in reference to step 704 of FIG. 7.

Step 906 then determines one or more parameters related to the identified object, including, but not limited to, a height associated with the identified object (object_height) and a corresponding offset associated with the identified object (object_position). In an embodiment, step 906 may compute the height associated with the identified object through the application of one or more JavaScript properties, as described above in reference to step 706 of FIG. 7. Further, as described above in reference to step 706 of FIG. 7, the offset associated with the identified object, i.e., the object position within the web document, may be computed using a cached value of the position unless a height of the web document is changed.

Step 908 then determines whether a lower edge of the identified object falls within the lower edge of the viewport. Similar to the embodiments of FIG. 7, the lower boundary of the viewport may expanded to account for the identified threshold detection distance. For example, step 908 may test whether the following expression is satisfied:

$$\text{lower\_edge\_identified\_object} > \text{lower\_edge\_viewing\_window}. \quad (7)$$

In Equation (7), lower_edge_identified_object represents a position of the lower edge of the identified object measured relative to the upper edge of the web document, and lower_edge_viewport represents a lower edge of the viewport, which may be expanded to account for the threshold detection distance. In an embodiment, lower_edge_identified_object and lower_edge_viewport may be calculated using the techniques outlined above in reference to Equations (2) and (6), respectively.

If step 908 determines that Equation (7) is satisfied, then the lower edge of the identified object falls below the expanded lower edge of the viewport. Therefore, in step 910, the identified object deemed is not visible to the user through the viewport of the user's web browser, since at least a portion of the identified object falls below of the expanded lower edge of the viewport, and method 900 is completed in step 916.

However, if step 908 determines that Equation (7) is not satisfied, then step 912 determines whether the upper edge of the identified object falls within the upper edge of the viewport. Similar to the embodiment of FIG. 7, the upper boundary of the browser viewport may be expanded upward in step 912 to account for the identified threshold detection distance. For example, step 912 may test whether the following expression is satisfied:

$$\text{upper\_edge\_identified\_object} > \text{upper\_edge\_viewport}. \quad (8)$$

In Equation (8), upper_edge_identified_object represents an upper edge of the identified object measured relative to the upper edge of the web document, and upper_edge_viewport represents a scroll position within the web document adjusted to account for the threshold distance. In an embodiment, upper_edge_identified_object and upper_edge_viewport may be calculated using the techniques outlined above in reference to Equations (3) and (5), respectively.

If step 912 determines that Equation (8) is satisfied, then the upper edge of the identified object falls above the expanded upper edge of the viewport. Accordingly, method 900 then passes back to step 910, which determines that the identified object is not visible, since at least a portion of the identified object falls above of the expanded upper edge of the viewport.

However, if step 912 determines that Equation (8) is not satisfied, then upper edge of the identified object falls below the expanded upper edge of the viewport. Further, as step 908 determined that the lower edge of the identified object falls above the expanded lower edge of the viewport, the identified object falls entirely within the boundaries of the viewport, as expanded to account for the threshold detection distance. Step 914 then deems the identified object to be visible to the user through the viewport, and method 900 is completed in step 916.

The embodiments of FIGS. 7 and 9 are described in terms of a non-zero threshold detection distance, i.e., the upper and lower edges of the viewport are effectively "expanded" to account for the presence of the non-zero threshold detection distance. However, the exemplary methods of FIGS. 7 and 9 are not limited to any particular threshold detection distance, and in additional embodiments, the threshold detection distances described above may be established to any non-zero value, or alternatively, may be set to zero, without departing from the spirit of scope of the present invention.

In an embodiment characterized by a zero threshold detection distance, any manipulation of objects outside of the user's browser viewport in anticipation of future scrolling by the user would be minimized, thereby further reducing the time and connection bandwidth required to load the presently-viewed content. Such an embodiment may be especially suited to those users who rarely view a substantial portion of a received web document, e.g., users of a search engine.

Further, in an embodiment, the exemplary processes of FIGS. 7 and 9 may be used to detect a visibility of an object as a user scrolls through a web document, i.e., whether the object is visible through the user's browser viewport at the user's current scroll position. However, the exemplary processes of FIGS. 7 and 9 are not limited to detecting the visibility of an object in response to the user's scrolling through the web document. In additional embodiments, the exemplary processes of FIGS. 7 and 9 may be incorporated within any additional or alternate application to detect whether an object is currently visible to a user, regardless of whether that user is scrolling towards the object.

For example, and in reference to FIG. 4, the exemplary processes of FIGS. 7 and 9 can be used to detect whether an object is viewable to a user before refreshing content associated with that object, e.g., a refreshable advertisement on a web page. In such an exemplary implementation, the refreshment of content associated with the object, or the execution of a script associated with the object, may replace the polling in step 412 of FIG. 4, or may be implemented in addition to the polling of step 412.

In embodiments described above, a user views a portion of a stored web document, e.g., web document 300, through a viewport, e.g., viewport 390, by scrolling through the web document to adjust a position of the viewport. In FIGS. 3A-3C, the web document is disposed according to a "portrait orientation," i.e., height 360 of web document 300 is larger than a corresponding width of document 300. As such, the user scrolls through web document 300 along direction 370 of web document 300, which is parallel with the height of web document 300.

Figure 10:
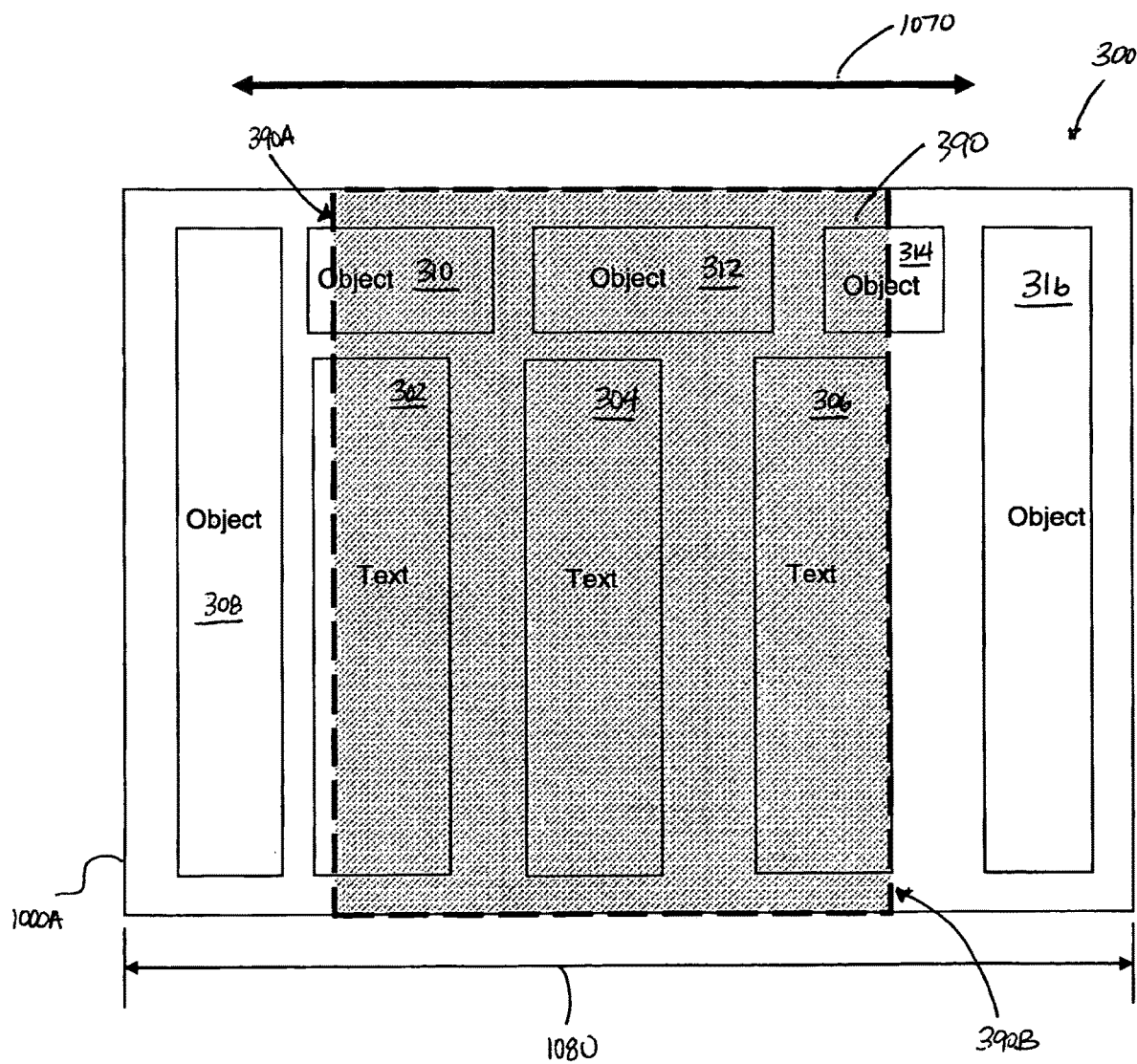
FIG. 10 illustrates features of an exemplary web document that may be selectively viewed and manipulated according to embodiments of the invention.

The embodiments described herein are not limited to the exemplary scrolling directions and exemplary orientations of web document 300. In an additional embodiment, web document 300 of FIGS. 3A-3C may be rotated ninety degrees and disposed in a landscape orientation, as depicted in FIG. 10. In FIG. 10, web document 300 includes text objects 302, 304, and 306, and media objects 308, 310, 312, 314, and 316, as described above in reference to FIGS. 3A-3C. However, in contrast to the embodiments described above, browser viewport 390 now traverses a body length 1080 of web document 300 in a scrolling direction 1070.

Furthermore, parameters such as an object height, an object offset, and a scroll position may be computed in a similar fashion to that described above in reference to FIGS. 7 and 9. In such embodiments, the computed values may be measured in pixels relative not to upper edge 300A of FIGS. 3A-3C, but relative to edge 1000A of FIG. 10. In an embodiment, such calculations may be relevant to useful within embodiments that leverage the capability of certain user devices, including, but not limited to mobile devices, to allow the user to view content both in a landscape orientation and in a portrait orientation.

The embodiments of FIGS. 7 and 9 deem an object visible to the user if that object falls, partially or entirely, within the upper and lower edges of the user's browser viewport, which may be extended to account for the threshold distance. For example, and in reference to FIG. 3C, the exemplary processes of FIGS. 7 and 9 may detect when object 316 becomes visible to the user through viewport 390 as the user scrolls towards object 316. However, the exemplary processes described above are not limited to the detection and manipulation of objects encountered while the user scrolls through web document 300 vertically along scroll direction 370.

In an additional or alternate embodiment, the exemplary processes described above can also detect and manipulate objects encountered as the user scrolls upwards through web document 300 along scroll direction 370, i.e., towards upper edge 300A of web document 300. For example, as the user scrolls upwards through web document 300 of FIG. 3C, the exemplary processes of FIGS. 7 and 9 can detect when object 307 becomes visible through viewport 390, and upon detection of object 307, the exemplary processes of FIGS. 4-6 can perform a corresponding manipulation of object 307, as described above.

Further, for example, the user may scroll through web document 300 in its entirety, thereby positioning lower edge 390B of viewport 390 at or near lower edge 300B of web document 300. In such an embodiment, the user may act to refresh web document 300, for example, by selecting a "Refresh" icon associated with the user's web browser, and the exemplary processes described above may be employed to detect objects as the user advances upwards through web document 300, and to subsequently perform a manipulation associated with the detected objects.

Figure 11:
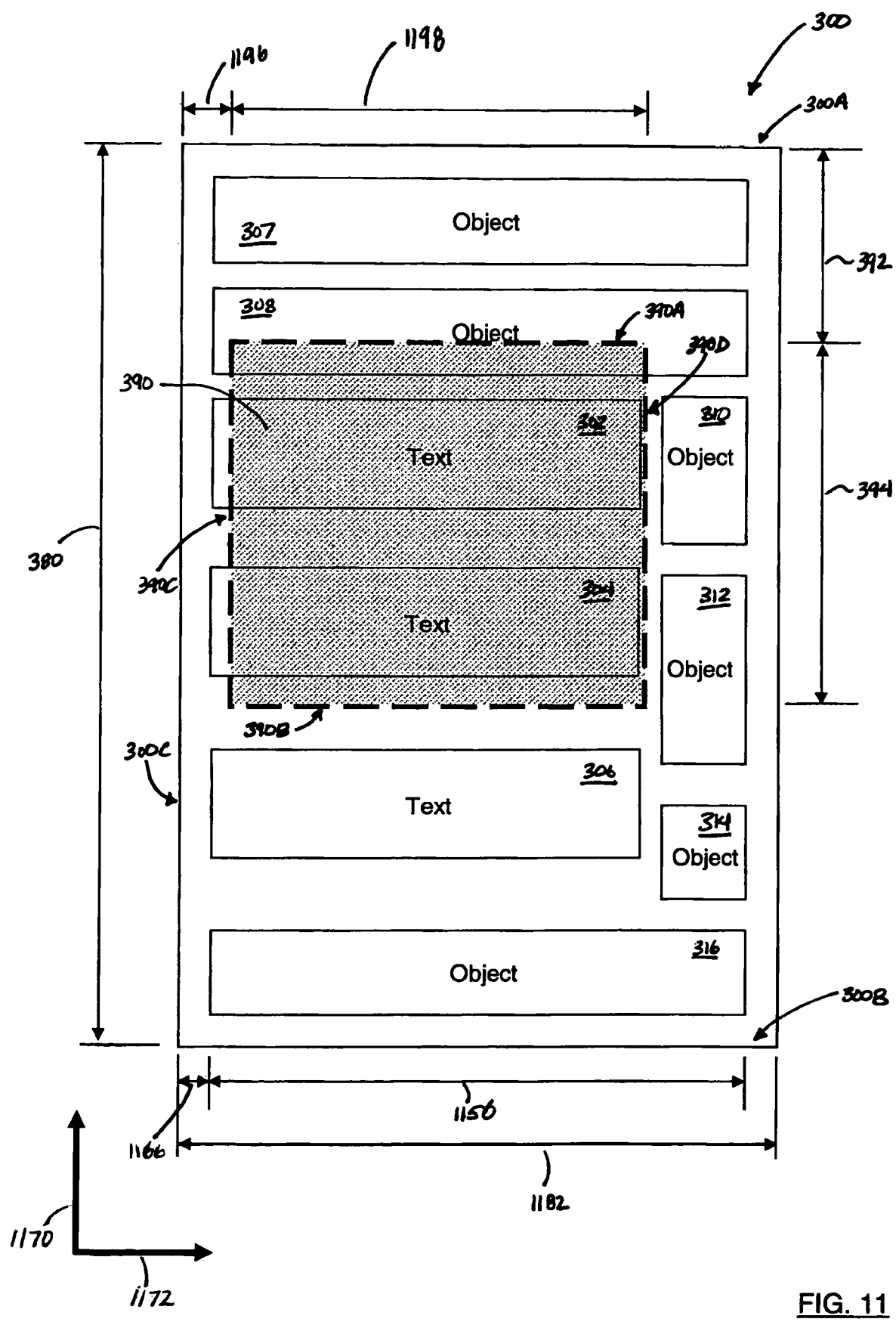
FIG. 11 illustrates features of an exemplary web document that may be selectively viewed and manipulated according to embodiments of the invention.

Further, in an additional or an independent embodiment, the exemplary processes of FIGS. 7 and 9 can detect whether an object falls within the horizontal boundaries of the viewport as the user scrolls through web document 300 in a horizontal direction, as depicted in FIG. 11. In FIG. 11, web document 300 includes text objects 302, 304, and 306, and media objects 307, 308, 310, 312, 314, and 316, as described above in reference to FIGS. 3A-3C. However, in contrast to the embodiments described above, viewport 390 not only traverses body length 380 of web document 300 in a vertical scrolling direction 1170, but viewport 390 also traverses body width 1182 of web document 300 in a horizontal scrolling direction 1172. In further contrast to the embodiments described above, body height 380 is larger than a height 394 of viewport 390, and body width 1182 is larger than a corresponding width 1198 of viewport 390.

In FIG. 11, body height 380 of web document 300, scroll position 392, and height 394 of viewport 390 may be computed as described above, for example, through the use of one or more JavaScript properties. Furthermore, although not depicted in FIG. 11, each object within web document 300 is associated with a corresponding vertical object offset, e.g., offset 340 of object 310 in FIG. 3B, and a corresponding object height, e.g., height 330 of object 310 in FIG. 3B, which are both measured relative to upper edge 300A of web document 300 along vertical scrolling direction 1170.

Moreover, in FIG. 11, each object within web document 300 is associated with a corresponding horizontal offset and a corresponding object width, each measured relative to a horizontal edge 300C of web document 300. For example, object 316 is associated with an offset 1166 and an object width 1156 that, in an embodiment, may be computed by applying one or more appropriate JavaScript functions to a variable associated with object 316. Further, and similar to the computation of the object offset described above in FIG. 8, object offset 1166 may be determined from a previously-computed and stored value of the offset unless width 1182 changes, e.g., through the inclusion of additional content. Although not depicted in FIG. 11, each of objects 302, 304, 306, 307, 308, 310, 312, and 314 is also associated with an offset and a width that, in an embodiment, may be computed in a fashion similar to offset 1166 and width 1156 described above.

Moreover, viewport 390 is also associated with a corresponding width 1198 and a corresponding offset 1196, which may determine a horizontal scroll position. In an embodiment, these parameters may be measured relative to horizontal edge 300C of web document 300 along horizontal scroll direction 1172. Further, horizontal scroll position 1196 and width 1198 may be determined through an application of one or more JavaScript properties to a variable associated with viewport 390, as described above.

In an embodiment, the exemplary processes described above can be applied to web document 300 of FIG. 11 to detect those objects within document 300 that become visible to a user in response to scrolling along vertical scroll direction 1170, scrolling along horizontal scroll direction 1172, or a combination of horizontal and vertical scrolling. In such an embodiment, method 900 of FIG. 9 may deem an object visible to the user when the object falls entirely within horizontal edges 390C and 390D of viewport 390 or alternatively, may deem the object visible when the object falls entirely within horizontal edges 390C and 390D and vertical edges 390A and 390B of viewport 390. For example, method 900 would deem no objects in FIG. 11 visible, since none of these objects falls entirely within viewport 390.

However, as described above, the detection process may incorporate a more expansive definition of object visibility. In such an embodiment, method 700 of FIG. 7 may deem an object within web document 300 visible to the user when at least a portion of the object falls within horizontal edges 390C and 390D of viewport 390 or, may alternatively deem the object visible when at least a portion of the object falls within horizontal edges 390C and 390D and vertical edges 390A and 390B of viewport 390. For example, exemplary method 700 would deem objects with 302, 304, and 308 of FIG. 11 visible, since a portion of each of these objects falls within viewport 390. Once deemed visible to the user, the exemplary methods of FIGS. 4-6 can be applied to perform a manipulation corresponding to the visible object, e.g., downloading content or executing a script.

Further, horizontal edges 390C and 390D may be expanded along horizontal scroll direction 1172 to account for a horizontal threshold detection distance. In an embodiment, the horizontal threshold detection distance may be identical to that threshold detection distance applied to vertical edges 390A and 390B, as described above in reference to FIGS. 7 and 9. However, in additional embodiments, the horizontal detection distance may differ from the vertical detection distance, and may be specified as any appropriate non-zero or zero value, without departing from the spirit and scope of the invention.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A computer-implemented method, comprising:
receiving, by a processor of a computer, a web page from a web server for storing at a storage location of the computer, the web page including one or more web objects for display on a web browser of the computer, at least a portion of the web page configured to be viewable to a user through a view port of the web browser, the view port measuring a first value of pixels in height and a second value of pixels offset from a top edge of the web browser;
determining, by the processor of the computer, whether a lower edge of a web object is viewable to a user through the view port of the web browser, the web object being viewable to the user when the lower edge of the web object is located: i) at least a third value of pixels offset from the top edge of the web browser and ii) less than a fourth value of pixels offset from the top edge of the web browser, the third value of pixels offset being greater than the second value of pixels offset, and the fourth value of pixels offset being less than the sum of the first value of pixels in height and the second value of pixels offset; and based on determining that the lower edge of the web object is viewable to the user through the view port of the web browser, enabling the web object to undergo one or more manipulations.

2. The computer-implemented method of claim 1, further comprising:

wherein the one or more manipulations include one of i) retrieving updated content from a server and ii) automatically executing a script for a call-back function related to the web object.

3. The computer-implemented method of claim 1, further comprising:

wherein the web object is further selected from a list comprising: digital endorsements, downloadable content, digital images, and streaming media.

4. The computer-implemented method of claim 1, wherein the web object includes a function that embeds content in a format appropriate for the web browser of the computer.

5. The computer-implemented method of claim 1, wherein a threshold distance is specified by the user of the web browser to be a zero-pixel threshold value.

6. The computer-implemented method of claim 1, further comprising determining a first parameter, wherein determining the first parameter includes:

determining whether the web browser supports a height property, the height property representing an inner height of the view port;

determining the first parameter using the height property when the web browser supports the height property; and determining the first parameter using one or more alternative properties when the web browser does not support the height property.

7. The computer-implemented method of claim 1, further comprising:

determining a relative position between upper objects in the web page and the web object, the upper objects being objects above the web object in the web page; and generating a web object position by adding the relative positions.

8. The computer-implemented method of claim 1, wherein:

a second parameter associated with the web page is a web page height; and the computer-implemented method further includes:

determining whether an object parameter is cached, including:

determining whether the web page height has changed since the object parameter was cached; and modifying an object parameter when the height of the web page is changed.

9. The computer-implemented method of claim 1, further comprising:

determining whether an upper edge of the web object falls below an expanded lower edge of the view port, the expanded lower edge being a lower edge of the view port modified by a threshold distance; and determining the web object is not visible by the user when the upper edge of the object falls below the expanded lower edge.

10. A system, comprising at least one processor implementing instructions for:

receiving, by a processor of a computer, a web page from a web server for storing at a storage location of the computer, the web page including one or more web objects for display on a web browser of the computer, at least a portion of the web page configured to be viewable to a user through a view port of the web browser, the view port measuring a first value of pixels in height and a second value of pixels offset from a top edge of the web browser;

determining, by the processor of the computer, whether a lower edge of a web object is viewable to a user through the view port of the web browser, the web object being viewable to the user when the lower edge of the web object is located: i) at least a third value of pixels offset from the top edge of the web browser and ii) less than a fourth value of pixels offset from the top edge of the web browser, the third value of pixels offset being greater than the second value of pixels offset, and the fourth value of pixels offset being less than the sum of the first value of pixels in height and the second value of pixels offset; and based on determining that the lower edge of the web object is viewable to the user through the view port of the web browser, enabling the web object to undergo one or more manipulations.

11. The system of claim 10, further comprising:

wherein the one or more manipulations include one of i) retrieving updated content from a server and ii) automatically executing a script for a call-back function related to the web object.

12. The system of claim 10, further comprising:

wherein the web object is further selected from a list comprising: digital endorsements, downloadable content, digital images, and streaming media.

13. The system of claim 10, wherein the web object includes a function that embeds content in a format appropriate for the web browser of the computer.

14. The system of claim 10, wherein a threshold distance is specified by the user of the web browser to be a zero-pixel threshold value.

15. The system of claim 10, further comprising determining a first parameter, wherein determining the first parameter includes:

determining whether the web browser supports a height property, the height property representing an inner height of the view port;

determining the first parameter using the height property when the web browser supports the height property; and determining the first parameter using one or more alternative properties when the web browser does not support the height property.

16. The system of claim 10, further comprising:

determining a relative position between upper objects in the web page and the web object, the upper objects being objects above the web object in the web page; and generating a web object position by adding the relative positions.

17. The system of claim 10, wherein:

a second parameter associated with the web page is a web page height; and the computer-implemented method further includes:

determining whether an object parameter is cached, including:

determining whether the web page height has changed since the object parameter was cached; and modifying an object parameter when the height of the web page is changed.

18. The system of claim 10, further comprising:

determining whether an upper edge of the web object falls below an expanded lower edge of the view port, the expanded lower edge being a lower edge of the view port modified by a threshold distance; and determining the web object is not visible by the user when the upper edge of the object falls below the expanded lower edge.

19. A non-transitory computer-readable medium, storing instructions that, when executed by at least one processor, cause the at least one processor to perform a method comprising:

receiving, by a processor of a computer, a web page from a web server for storing at a storage location of the computer, the web page including one or more web objects for display on a web browser of the computer, at least a portion of the web page configured to be viewable to a user through a view port of the web browser, the view port measuring a first value of pixels in height and a second value of pixels offset from a top edge of the web browser;

determining, by the processor of the computer, whether a lower edge of a web object is viewable to a user through the view port of the web browser, the web object being viewable to the user when the lower edge of the web object is located: i) at least a third value of pixels offset from the top edge of the web browser and ii) less than a fourth value of pixels offset from the top edge of the web browser, the third value of pixels offset being greater than the second value of pixels offset, and the fourth value of pixels offset being less than the sum of the first value of pixels in height and the second value of pixels offset; and based on determining that the lower edge of the web object is viewable to the user through the view port of the web browser, enabling the web object to undergo one or more manipulations.

20. The non-transitory computer-readable medium of claim 19, further comprising:

wherein the one or more manipulations include one of i) retrieving updated content from a server and ii) automatically executing a script for a call-back function related to the web object.

* * * * *